US012165147B2

(12) United States Patent
Gonzales, Jr.

(10) Patent No.: US 12,165,147 B2
(45) Date of Patent: Dec. 10, 2024

(54) USER CONTROLLED STORAGE AND SHARING OF PERSONAL USER INFORMATION ON A BLOCKCHAIN

(71) Applicant: eBay Inc., San Jose, CA (US)

(72) Inventor: Sergio Pinzon Gonzales, Jr., San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/083,327

(22) Filed: Dec. 16, 2022

(65) Prior Publication Data

US 2023/0122875 A1 Apr. 20, 2023

Related U.S. Application Data

(63) Continuation of application No. 16/020,975, filed on Jun. 27, 2018, now Pat. No. 11,544,708.
(Continued)

(51) Int. Cl.
*H04L 29/06* (2006.01)
*G06F 21/10* (2013.01)
(Continued)

(52) U.S. Cl.
CPC ........... *G06Q 20/389* (2013.01); *G06F 21/10* (2013.01); *G06F 21/30* (2013.01); *G06F 21/602* (2013.01);
(Continued)

(58) Field of Classification Search
CPC .................. G06F 16/27; G06F 21/645; G06F 2221/2107; H04L 2209/56
See application file for complete search history.

(56) References Cited

U.S. PATENT DOCUMENTS 5,557,088 A 9/1996 Shimizu et al.
5,607,350 A 3/1997 Levasseur et al.
(Continued)

FOREIGN PATENT DOCUMENTS

CN 106130738 A 11/2016
CN 106777923 A 5/2017
(Continued)

OTHER PUBLICATIONS

US 10,680,815 B2, 06/2020, Chan et al. (withdrawn)
(Continued)

*Primary Examiner* — Jeffery L Williams
(74) *Attorney, Agent, or Firm* — Shook, Hardy & Bacon L.L.P.

(57) ABSTRACT

Technologies are shown for secure management of personal information data involving storing personal information data in a personal information data block and committing the personal information data block to a personal information data blockchain and authorizing access to the personal information data by a platform entity by storing a platform identifier corresponding to the platform entity in authorized access data. An access request is received from the platform entity that includes the platform identifier for the first platform entity. If the platform identifier is verified to be in the authorized access data, the personal information data is obtained from the personal information data blockchain and returned to the platform entity. In some examples, the authorized access data includes permissions that identify portions of the personal information data that the platform entity can access. In other examples, the authorized access data is secured on an authorized access data blockchain.

20 Claims, 19 Drawing Sheets

Related U.S. Application Data

(60) Provisional application No. 62/612,091, filed on Dec. 29, 2017.

(51) Int. Cl.

| | |
|---|---|
| *G06F 21/30* | (2013.01) |
| *G06F 21/60* | (2013.01) |
| *G06F 21/62* | (2013.01) |
| *G06Q 20/08* | (2012.01) |
| *G06Q 20/38* | (2012.01) |
| *G06Q 20/40* | (2012.01) |
| *G06Q 20/42* | (2012.01) |
| *G06Q 30/018* | (2023.01) |
| *G06Q 40/08* | (2012.01) |
| *H04L 9/06* | (2006.01) |
| *H04L 9/30* | (2006.01) |
| *H04L 9/32* | (2006.01) |
| *H04L 9/40* | (2022.01) |
| *H04L 65/612* | (2022.01) |
| *H04L 67/53* | (2022.01) |
| *H04L 67/63* | (2022.01) |
| *G06F 16/18* | (2019.01) |
| *G06F 16/27* | (2019.01) |
| *G06F 21/64* | (2013.01) |
| *H04L 9/00* | (2022.01) |
| *H04L 67/52* | (2022.01) |

(52) U.S. Cl.
CPC ......... *G06F 21/62* (2013.01); *G06F 21/6218* (2013.01); *G06F 21/6245* (2013.01); *G06Q 20/0855* (2013.01); *G06Q 20/3825* (2013.01); *G06Q 20/3829* (2013.01); *G06Q 20/401* (2013.01); *G06Q 20/42* (2013.01); *G06Q 30/018* (2013.01); *G06Q 40/08* (2013.01); *H04L 9/0637* (2013.01); *H04L 9/0643* (2013.01); *H04L 9/30* (2013.01); *H04L 9/3236* (2013.01); *H04L 9/3239* (2013.01); *H04L 9/3247* (2013.01); *H04L 9/3297* (2013.01); *H04L 63/102* (2013.01); *H04L 63/12* (2013.01); *H04L 65/612* (2022.05); *H04L 67/53* (2022.05); *H04L 67/63* (2022.05); *G06F 16/1805* (2019.01); *G06F 16/27* (2019.01); *G06F 21/645* (2013.01); *G06F 2221/2107* (2013.01); *H04L 9/50* (2022.05); *H04L 67/52* (2022.05); *H04L 2209/56* (2013.01)

(56) References Cited

U.S. PATENT DOCUMENTS

| | | | |
|---|---|---|---|
| 6,067,532 A | 5/2000 | Gebb | |
| 6,161,183 A | 12/2000 | Saito et al. | |
| 7,228,313 B1 | 6/2007 | Hand et al. | |
| 7,627,531 B2 | 12/2009 | Breck et al. | |
| 7,656,271 B2 | 2/2010 | Ehrman et al. | |
| 9,635,000 B1 | 4/2017 | Muftic | |
| 9,641,342 B2 | 5/2017 | Sriram et al. | |
| 9,680,799 B2 | 6/2017 | Iyer et al. | |
| 9,715,602 B1 | 7/2017 | Fowler et al. | |
| 9,722,790 B2 | 8/2017 | Ebrahimi | |
| 9,749,140 B2 | 8/2017 | Oberhauser et al. | |
| 9,749,297 B2 | 8/2017 | Gvili | |
| 9,774,578 B1 | 9/2017 | Ateniese et al. | |
| 9,794,074 B2 | 10/2017 | Toll et al. | |
| 9,849,364 B2 | 12/2017 | Tran et al. | |
| 10,022,613 B2 | 7/2018 | Tran et al. | |
| 10,523,443 B1 | 12/2019 | Kleinman | |
| 10,657,595 B2 | 5/2020 | De Jong et al. | |
| 10,715,323 B2 | 7/2020 | Chan et al. | |
| 10,764,067 B2 | 9/2020 | Lewison et al. | |
| 10,839,386 B2 | 11/2020 | Kamalsky et al. | |
| 10,896,418 B2 | 1/2021 | Gonzales, Jr. | |
| 10,977,647 B2 | 4/2021 | Gonzales, Jr. | |
| 11,115,205 B2 | 9/2021 | Bitauld et al. | |
| 11,130,042 B2 | 9/2021 | Tran et al. | |
| 11,379,834 B2 | 7/2022 | Gonzales, Jr. | |
| 11,481,511 B2 * | 10/2022 | Amar | H04L 9/3247 |
| 11,544,708 B2 * | 1/2023 | Gonzales, Jr. | H04L 65/612 |
| 11,682,053 B2 * | 6/2023 | Tietzen | G06Q 30/0279 |
| | | | 705/329 |
| 11,756,030 B2 | 9/2023 | Gonzales, Jr. | |
| 11,803,847 B2 | 10/2023 | Kamalsky et al. | |
| 2003/0216973 A1 | 11/2003 | Walker et al. | |
| 2004/0010427 A1 | 1/2004 | Barnes et al. | |
| 2004/0024688 A1 | 2/2004 | Bi et al. | |
| 2004/0181468 A1 | 9/2004 | Harmon et al. | |
| 2004/0192437 A1 | 9/2004 | Amaitis et al. | |
| 2006/0100965 A1 | 5/2006 | Simelius | |
| 2006/0265289 A1 | 11/2006 | Bellissimo | |
| 2008/0154623 A1 | 6/2008 | Derker et al. | |
| 2008/0162197 A1 | 7/2008 | Harris et al. | |
| 2009/0164635 A1 | 6/2009 | Denker et al. | |
| 2012/0185394 A1 | 7/2012 | Gelfand et al. | |
| 2013/0174272 A1 | 7/2013 | Chevalier et al. | |
| 2013/0219458 A1 | 8/2013 | Ramanathan | |
| 2014/0136248 A1 | 5/2014 | Matarazzi et al. | |
| 2015/0120343 A1 | 4/2015 | Burger-Lenehan et al. | |
| 2015/0154571 A1 | 6/2015 | Zamer | |
| 2015/0269538 A1 | 9/2015 | Stanchfield | |
| 2015/0302400 A1 | 10/2015 | Metral | |
| 2015/0332283 A1 | 11/2015 | Witchey | |
| 2016/0028552 A1 | 1/2016 | Spanos et al. | |
| 2016/0044203 A1 | 2/2016 | Paul et al. | |
| 2016/0125403 A1 | 5/2016 | Hu et al. | |
| 2016/0191243 A1 | 6/2016 | Manning | |
| 2016/0203572 A1 | 7/2016 | Mcconaghy et al. | |
| 2016/0283941 A1 | 9/2016 | Andrade | |
| 2016/0284033 A1 | 9/2016 | Winand | |
| 2016/0300234 A1 | 10/2016 | Moss-pultz et al. | |
| 2016/0321752 A1 | 11/2016 | Tabacco | |
| 2016/0330034 A1 | 11/2016 | Back et al. | |
| 2016/0335533 A1 | 11/2016 | Davis | |
| 2016/0342976 A1 | 11/2016 | Davis | |
| 2016/0342977 A1 | 11/2016 | Lam | |
| 2016/0358184 A1 | 12/2016 | Radocchia et al. | |
| 2016/0379212 A1 | 12/2016 | Bowman et al. | |
| 2017/0005804 A1 | 1/2017 | Zinder | |
| 2017/0011460 A1 | 1/2017 | Molinari et al. | |
| 2017/0024818 A1 | 1/2017 | Wager et al. | |
| 2017/0046526 A1 | 2/2017 | Chan et al. | |
| 2017/0046651 A1 | 2/2017 | Lin | |
| 2017/0046664 A1 | 2/2017 | Haldenby et al. | |
| 2017/0046693 A1 | 2/2017 | Haldenby et al. | |
| 2017/0046806 A1 | 2/2017 | Haldenby et al. | |
| 2017/0048209 A1 | 2/2017 | Lohe et al. | |
| 2017/0078493 A1 | 3/2017 | Melika et al. | |
| 2017/0103385 A1 | 4/2017 | Wilson et al. | |
| 2017/0103390 A1 | 4/2017 | Wilson et al. | |
| 2017/0109735 A1 | 4/2017 | Sheng et al. | |
| 2017/0116693 A1 | 4/2017 | Rae | |
| 2017/0132620 A1 | 5/2017 | Miller et al. | |
| 2017/0132626 A1 | 5/2017 | Kennedy | |
| 2017/0132630 A1 | 5/2017 | Castinado et al. | |
| 2017/0149560 A1 * | 5/2017 | Shah | G06K 7/1417 |
| 2017/0177898 A1 * | 6/2017 | Dillenberger | G06F 21/6227 |
| 2017/0213210 A1 | 7/2017 | Kravitz et al. | |
| 2017/0213221 A1 | 7/2017 | Kurian et al. | |
| 2017/0232300 A1 | 8/2017 | Tran et al. | |
| 2017/0236102 A1 | 8/2017 | Biton | |
| 2017/0236103 A1 | 8/2017 | Biton | |
| 2017/0236104 A1 | 8/2017 | Biton | |
| 2017/0237570 A1 | 8/2017 | Vandervort | |
| 2017/0243025 A1 | 8/2017 | Kurian et al. | |
| 2017/0243193 A1 | 8/2017 | Manian et al. | |
| 2017/0250796 A1 | 8/2017 | Samid | |
| 2017/0300627 A1 | 10/2017 | Giordano et al. | |
| 2017/0300928 A1 | 10/2017 | Radocchia et al. | |
| 2017/0302663 A1 | 10/2017 | Nainar | |
| 2017/0308872 A1 | 10/2017 | Uhr et al. | |

(56) References Cited

U.S. PATENT DOCUMENTS

| | | |
|---|---|---|
| 2017/0317997 A1 | 11/2017 | Smith et al. |
| 2017/0329980 A1 | 11/2017 | Hu et al. |
| 2017/0331810 A1 | 11/2017 | Kurian |
| 2017/0337534 A1 | 11/2017 | Goeringer et al. |
| 2017/0338967 A1 | 11/2017 | Lewison et al. |
| 2017/0344580 A1 | 11/2017 | King |
| 2017/0345011 A1 | 11/2017 | Salami et al. |
| 2017/0346637 A1 | 11/2017 | Zhang |
| 2017/0366353 A1 | 12/2017 | Struttmann |
| 2018/0018723 A1 | 1/2018 | Nagla et al. |
| 2018/0025442 A1 | 1/2018 | Isaacson et al. |
| 2018/0060496 A1* | 3/2018 | Bulleit ............... H04L 9/0643 |
| 2018/0078843 A1 | 3/2018 | Tran et al. |
| 2018/0083786 A1 | 3/2018 | Dierks et al. |
| 2018/0091524 A1 | 3/2018 | Setty et al. |
| 2018/0101844 A1 | 4/2018 | Song et al. |
| 2018/0108089 A1 | 4/2018 | Jayachandran |
| 2018/0117447 A1 | 5/2018 | Tran et al. |
| 2018/0130050 A1 | 5/2018 | Taylor et al. |
| 2018/0143995 A1 | 5/2018 | Bailey et al. |
| 2018/0158054 A1 | 6/2018 | Ardashev et al. |
| 2018/0167198 A1 | 6/2018 | Muller et al. |
| 2018/0173719 A1 | 6/2018 | Bastide et al. |
| 2018/0181730 A1 | 6/2018 | Lyske |
| 2018/0189528 A1 | 7/2018 | Hanis et al. |
| 2018/0257306 A1 | 9/2018 | Mattingly et al. |
| 2018/0278422 A1 | 9/2018 | Young et al. |
| 2018/0294957 A1 | 10/2018 | O'brien et al. |
| 2018/0309569 A1 | 10/2018 | Martin et al. |
| 2018/0330348 A1 | 11/2018 | Uhr et al. |
| 2018/0330349 A1 | 11/2018 | Uhr et al. |
| 2018/0349621 A1 | 12/2018 | Schvey et al. |
| 2018/0349893 A1 | 12/2018 | Tsai |
| 2019/0013932 A1 | 1/2019 | Maino et al. |
| 2019/0050856 A1 | 2/2019 | Iustina-Miruna |
| 2019/0066001 A1 | 2/2019 | Hunt |
| 2019/0102409 A1 | 4/2019 | Shi et al. |
| 2019/0109713 A1 | 4/2019 | Clark et al. |
| 2019/0132138 A1 | 5/2019 | Finlow-bates et al. |
| 2019/0172026 A1* | 6/2019 | Vessenes ............... G06Q 20/065 |
| 2019/0172057 A1 | 6/2019 | Stephane |
| 2019/0205558 A1 | 7/2019 | Gonzales, Jr. |
| 2019/0205563 A1* | 7/2019 | Gonzales, Jr. ......... H04L 9/0637 |
| 2019/0205826 A1 | 7/2019 | Hanis et al. |
| 2019/0205870 A1 | 7/2019 | Kamalsky et al. |
| 2019/0205873 A1 | 7/2019 | Kamalsky et al. |
| 2019/0205894 A1 | 7/2019 | Gonzales, Jr. et al. |
| 2019/0207759 A1 | 7/2019 | Chan et al. |
| 2019/0207995 A1 | 7/2019 | Gonzales, Jr. |
| 2019/0318351 A1 | 10/2019 | Ardashev et al. |
| 2019/0334724 A1 | 10/2019 | Anton et al. |
| 2020/0012763 A1 | 1/2020 | Arngren et al. |
| 2020/0026712 A1* | 1/2020 | Madisetti ............... G06Q 20/06 |
| 2020/0027096 A1 | 1/2020 | Cooner |
| 2020/0036519 A1 | 1/2020 | Bitauld et al. |
| 2020/0110821 A1 | 4/2020 | Chan et al. |
| 2020/0119905 A1 | 4/2020 | Revankar et al. |
| 2020/0195436 A1 | 6/2020 | Khan |
| 2020/0211005 A1 | 7/2020 | Bodorik et al. |
| 2020/0235926 A1 | 7/2020 | Chan et al. |
| 2020/0258176 A1 | 8/2020 | Gibson et al. |
| 2020/0311299 A1* | 10/2020 | Amar .................... H04L 9/3247 |
| 2021/0035096 A1 | 2/2021 | Kamalsky et al. |
| 2021/0110388 A1 | 4/2021 | Gonzales, Jr. |
| 2021/0201305 A1 | 7/2021 | Gonzales, Jr. |
| 2022/0309511 A1 | 9/2022 | Metnick et al. |
| 2023/0004675 A1* | 1/2023 | Amar .................... H04L 9/3247 |
| 2023/0122875 A1* | 4/2023 | Gonzales, Jr. ....... G06Q 30/018 726/4 |
| 2023/0342734 A1* | 10/2023 | Padmanabhan ....... H04L 9/3297 |

FOREIGN PATENT DOCUMENTS

| | | |
|---|---|---|
| CN | 106920169 A | 7/2017 |
| CN | 107070644 A | 8/2017 |
| CN | 107077682 A | 8/2017 |
| CN | 107086909 A | 8/2017 |
| CN | 107273759 A | 10/2017 |
| CN | 107798650 A | 3/2018 |
| EP | 3413254 A1 | 12/2018 |
| KR | 10-1781583 B1 | 9/2017 |
| WO | 01/73707 A2 | 10/2001 |
| WO | 2006/008571 A1 | 1/2006 |
| WO | 2008/070781 A2 | 6/2008 |
| WO | 2016/047991 A1 | 3/2016 |
| WO | 2016/128567 A1 | 8/2016 |
| WO | 2017/004527 A1 | 1/2017 |
| WO | 2017/006136 A1 | 1/2017 |
| WO | 2017/027900 A1 | 2/2017 |
| WO | 2017/066002 A1 | 4/2017 |
| WO | 2017/090041 A1 | 6/2017 |
| WO | 2017/098519 A1 | 6/2017 |
| WO | 2017/145003 A1 | 8/2017 |
| WO | 2017/145017 A1 | 8/2017 |
| WO | 2017/145047 A1 | 8/2017 |
| WO | 2017/148245 A1 | 9/2017 |
| WO | 2017/153495 A1 | 9/2017 |
| WO | 2017/163069 A1 | 9/2017 |
| WO | 2017/163220 A1 | 9/2017 |
| WO | 2017/178956 A1 | 10/2017 |
| WO | 2017/182601 A1 | 10/2017 |
| WO | 2017/195160 A1 | 11/2017 |
| WO | 2017/196701 A1 | 11/2017 |
| WO | 2019/133307 A1 | 7/2019 |
| WO | 2019/133308 A1 | 7/2019 |
| WO | 2019/133309 A1 | 7/2019 |
| WO | 2019/133310 A1 | 7/2019 |
| WO | 2020/076535 A1 | 4/2020 |

OTHER PUBLICATIONS

Yang, L., Jiang, R., Pu, X. et al. An access control model based on blockchain master-sidechain collaboration. Cluster Comput (2023). https://doi.org/10.1007/s10586-022-03964-x (Year: 2023).*
Final Office Action Received for U.S. Appl. No. 17/190,846, mailed on Mar. 17, 2023, 12 pages.
A Tech Startup Wants To Use Blockchain To Make Event Tickets Fraud-Proof, Retrieved from the Internet URL: <https://www.forbes.com/sites/forbestreptalks/2017/06/15/a-tech-startup-upgraded-wants-to-use-blockchain-to-make-event-tickets-fraud-proof-and-to-sell-more-stuff-to-fans/#41659e3a7ffa>, Jun. 15, 2017, 5 pages.
Blockchain in Ticketing. Why do ticketing companies need it?—Softjourn, Retrieved from the Internet URL: <https://softjourn.com/blockchain-in-ticketing>, Accessed on Sep. 11, 2018, 7 pages.
Blockchain Secure Event Ticketing For Music, Festivals And Meetups, Retrieved from the Internet URL: <https://eventchain.io/>, Accessed on Sep. 11, 2018, 9 pages.
Blockchain Startups Take on Ticket Touting, But Will They Gain Traction?, Retrieved from the Internet URL: <https://www.coindesk.com/blockchain-startups-take-ticket-touting-will-gain-traction/>, Jul. 31, 2017, 5 pages.
Blocktix—An Ethereum event hosting platform designed for the real world, Retrieved from the Internet URL: <https://blog.blocktix.io/blocktix-an-ethereum-event-hosting-platform-designed-for-the-real-world-d52f8a838ecc>, Jan. 25, 2017, 3 pages.
Cloudchain—Ticketing Platform Based On Blockchain—Reply, Retrieved from the Internet URL: <http://www.reply.com/en/content/blockchain-ticketing-solution-cloudchain>, Accessed on Sep. 11, 2018, 3 pages.
Craig Srpoule: "Statement regarding Forward-Looking Statements", Retrieved from the Internet URL : <URL:https://www.crowdmachine.com/docs/whitepaper.pdf>, Feb. 1, 2018, 12 pages.
Crypto.tickets, Retrieved from the Internet URL: <https://blog.crypto.tickets/>, Accessed on Sep. 11, 2018, 2 pages.
Ethereum Wallets are Enabling Transaction Scheduling, Killer Feature, Ethereum News, Retrieved from the Internet URL: <https://

(56) References Cited

OTHER PUBLICATIONS www.ccn.com/ethereum-wallets-are-enabling-transaction-scheduling-killer-feature/>, Sep. 18, 2018, 6 pages.
GUTS Tickets—Honest ticketing, Retrieved from the Internet URL: <https://guts.tickets/>, Accessed on Sep. 11, 2018, 9 pages.
The Alarm Service Is Now Available On The Testnet, Retrieved from the Internet URL: <http://blog.ethereum-alarm-clock.com/blog/2016/1/16/the-alarm-service-is-now-available-on-the-testnet>, Jan. 16, 2016, 2 pages.
The Aventus Protocol: Blockchain for Ticketing, Retrieved from the Internet URL: <https://aventus.io/>, Accessed on Sep. 11, 2018, 9 pages.
Upgraded Tickets, Retrieved from the Internet URL: <https://www.upgraded-inc.com/>, Accessed on Sep. 11, 2018, 14 pages.
Anonymous,"Is Blockchain The Answer To Copyright Issues?", Retrieved from the Internet URL :<https://medium.com/contentos-io/is-blockchain-the-answer-to-copyright-issues-f93344329295>, May 11, 2018, 3 pages.
Ateniese et al., "Redactable Blockchain—or—Rewriting History in Bitcoin and Friends", IEEE European Symposium on Security and Privacy, May 11, 2017, 38 pages.
Bhargavan et al., "Short Paper: Formal Verification of Smart Contracts", retrieved From Internet URL<http://research.microsoft.com/en-us/um/people/nswamy/papers/solidether.pdf>, Aug. 27, 2016, pp. 1-6.
Bidder Coin, "Bidder Coin, Bidder Coin White Paper, Dec. 28, 2017, pp. 36", Dec. 28, 2017, 36 pages.
Chainfrog, "What are Smart Contracts?", Retrieved from the Internet URL: <http://www.chainfrog.com/wp-content/uploads/2017/08/smart-contracts.pdf>, 2017, 13 pages.
Chan,"Motif Finding", Retrieved from the Internet URL: <https://www.mathworks.com/matlabcentral/fileexchange/29362-motif-finding>, Nov. 15, 2010, 4 pages.
Chen et al., "Under-Optimized Smart Contracts Devour Your Money", Retrieved from the Internet URL: <https://arxiv.org/pdf/1703.03994.pdf >, Mar. 11, 2016, 5 pages.
Chronologic,"Temporal Innovation on the Blockchain", Retrieved from the Internet URL: <https://chronologic.network/uploads/Chronologic_Whitepaper.pdf>, Oct. 11, 2018, 25 pages.
Ethereum, "blockchain—How can a contract run itself at a later time?", Retrieved from the Internet URL :<https://ethereum.stackexchange.com/questions/42/how-can-a-contract-run-itself-at-a-later-time>, Accesses date on Sep. 24, 2018, 12 pages.
Gipp et al., "CryptSubmit: Introducing Securely Timestamped Manuscript Submission and Peer Review Feedback Using the Blockchain", 2017 ACM/IEEE Joint Conference on Digital Libraries (JCDL). IEEE, Jun. 19, 2017, 4 pages.
Gollapudi, "White Paper—A Next-Generation Smart Contract and Decentralized Application Platform", Retrieved from the Internet URL: < https://github.com/ethereum/wiki/wiki/White-Paper/f18902f4e7fb21dc92b37e8a0963eec4b3f4793a >, May 29, 2017, pp. 1-23.
Huckle et al., "Internet ofThings, Blockchain and Shared Economy Applications", Procedia Computer Science. Elsevier B.V. 98: 463., 2016, pp. 461-466.
Kehrli, "Blockchain Explained", Retrieved from the Internet URL: <https://www.niceideas.ch/blockchain_explained.pdf>, Oct. 7, 2016, pp. 1-25.
Kishigami et al., "The Blockchain-Based Digital Content Distribution System", 2015 IEEE Fifth International Conference on Big Data and Cloud Computing, Aug. 1, 2015, pp. 187-190.
Kong et al., "High obfuscation plagiarism detection using multi-feature fusion based on Logical Regression mode", 2015 4th International Conference on Computer Science and Network Technology (ICCSNT), Dec. 19, 2015, 5 pages.
Ramachandran,"Ramachandran, "Using Blockchain and smart contracts for secure data provenance management," Sep. 28, 2017, pp. 1-11", Aug. 28, 2017, 11 pages.
Steichen et al., "Blockchain-Based, Decentralized Access Control for IPFS", Retrieved from the Internet URL: <https://www.researchgate.net/publication/327034734>, Jul. 2018, 9 pages.
Szabo, "Smart Contracts: Building Blocks for Digital Markets", Retrieved online from the Internet URL: <http://www.alamut.com/subj/economics/nick_szabo/smartContracts.html>, 1996, pp. 1-17.
Triantafyllidis,"Developing an Ethereum Blockchain Application", Retrieved from the Internet URL: <http://www.delaat.net/rp/2015-2016/p53/report.pdf >, Feb. 19, 2016, 59 pages.
White Paper, "White Paper: PGP Key Management Server from Symantec", An Introduction to PGP Key Management Server from Symantec, 2010, 17 pages.
Zhang, "Orthogonality Between Key Privacy and Data Privacy", ResearchGate, Revisited, Conference Paper, Aug. 2007, Aug. 2007, 17 pages.
Notice of Allowance received for U.S. Appl. No. 17/190,846, mailed on May 10, 2023, 7 pages.
Final Office Action Received for U.S. Appl. No. 16/041,658, mailed on Dec. 28, 2022, 18 pages.
Final Office Action Received for U.S. Appl. No. 17/067,084, mailed on Jan. 31, 2023, 16 pages.
International Preliminary Report on Patentability received for PCT Application No. PCT/US2018/065851, mailed on Jul. 9, 2020, 8 pages.
International Preliminary Report on Patentability received for PCT Patent Application No. PCT/US2018/065852, mailed on Jul. 9, 2020, 8 pages.
International Preliminary Report on Patentability received for PCT Patent Application No. PCT/US2018/065854, mailed on Jul. 9, 2020, 8 pages.
International Preliminary Report on Patentability received for PCT Patent Application No. PCT/US2018/065860, mailed on Jul. 9, 2020, 8 pages.
International Search Report and Written Opinion received for PCT Patent Application No. PCT/US2018/065852, mailed on Feb. 19, 2019, 11 pages.
International Search Report and Written Opinion received for PCT Patent Application No. PCT/US2018/065854, mailed on Feb. 21, 2019, 10 pages.
International Search Report and Written Opinion received for PCT Patent Application No. PCT/US2018/065860, mailed on Feb. 19, 2019, 10 pages.
International Search Report received for PCT Application No. PCT/US2019/053779, mailed on Dec. 5, 2019, 3 pages.
International Search Report received for PCT Application No. PCT/US2018/065851, mailed on Feb. 18, 2019, 4 pages.
International Written Opinion received for PCT Application No. PCT/US2019/053779, mailed on Dec. 5, 2019, 7 pages.
Notice of Allowance received for U.S. Appl. No. 18/226,671, mailed on Apr. 18, 2024, 7 pages.
Notice of Allowance received for U.S. Appl. No. 18/226,671, mailed on Jul. 17, 2024, 8 pages.

\* cited by examiner

PERSONAL INFORMATION DATA BLOCK

METHODS
Store.Personal.Info(personal.infoID, personal.infoDATA, owner) /*
Called by user owner of personal information */
{
    if(personal.infoID.write ==true && caller == owner)
        WritePersonal.Info(personal.infoID,
            personal.infoDATA);
}

Share(personal.infoID, platformID, owner)
/* Called by owner to share personal info with platform */
{
    if(caller == owner && personal.infoID.share == true)
        personal.infoID.recipient=platformID
        personal.infoID.data = share
}

Access(platformID)
/* Called by platform to access personal information data. Search authorized access list for platformID. */
{
    found = search_on_auth_access_blockchain(platformID)
    if(found == TRUE && personal.infoID.data==share)
        return(personal.infoDATA)
}

```
PERSONAL INFORMATION DATA BLOCK

METHODS
Store.Personal.Info(personal.infoID, personal.infoDATA, owner) /*
Called by user owner of personal information */
{
        if(personal.infoID.write ==true && caller == owner)
            WritePersonal.Info(personal.infoID,
                    personal.infoDATA);
}

Share(personal.infoID, platformID, owner)
 /* Called by owner to share personal info with platform */
{
        if(caller == owner && personal.infoID.share == true)
            personal.infoID.recipient=platformID
            personal.infoID.data = share
}

Access(encrypt.platformID)
/* Called by platform to access personal information.  Search
encrypted authorized access list for platformID. */
{
found = search_on_auth_access_blockchain(encrypt.platformID)
        if(found == TRUE && personal.infoID.data==share)
                return(personal.infoDATA)
}
```

PERSONAL INFORMATION DATA BLOCK

METHODS
Store.Personal.Info(personal.infoID, personal.infoDATA, owner) /*
Called by user owner of personal information */
{
    if(personal.infoID.write ==true && caller == owner)
        WritePersonal.Info(personal.infoID,
            personal.infoDATA);
}

Share(personal.infoID, platformID, permissions, owner)
/* Called by owner to share personal info with platform */
{
    if(caller == owner && personal.infoID.share == true)
        personal.infoID.recipient=platformID
        personal.infoID.data = permissions
}

Access(platformID)
/* Called by platform to access personal information. Search
authorized access list for platformID and obtain permissions. */
{
    found = search_on_auth_access_blockchain(platformID)
    if(found == TRUE)
        authDATA = FilterData(personal.infoDATA,
            personal.infoID.data)
        return(authDATA)
}

USER CONTROLLED STORAGE AND SHARING OF PERSONAL USER INFORMATION ON A BLOCKCHAIN

CROSS REFERENCE TO RELATED APPLICATIONS

This application is a continuation application of U.S. application Ser. No. 16/020,975, titled "USER CONTROLLED STORAGE AND SHARING OF PERSONAL USER INFORMATION ON A BLOCKCHAIN," and filed Jun. 27, 2018; which claims the benefit of U.S. Provisional Patent Appl. No. 62/612,091 for "Enhanced Distributed Database and Data Communications Operations" filed Dec. 29, 2017; both of which are herein incorporated by reference in their entirety for all purposes.

BACKGROUND

Users often provide digitized personal user information in a variety of different contexts, such as social network profile information, electronic health records, employment history, resume or curriculum vitae information, or personal preferences. Often, these contexts correspond to different platforms controlled by different operators, such as FACEBOOK, LINKEDIN or GOOGLE. Also, the operators of these platforms on which users store such personal information often do not allow users to transfer their personal information from one platform to another platform or even to the user's personal computing environment.

Further, these platform operators often leverage, exploit, and transact personal user information (with the consent of the platform's users through the platform's terms and conditions) primarily for their own business interests, such as identifying corresponding or complimentary products, services, or content to offer their users.

This current arrangement leaves users with little to no control in the portability of their own personal information stored on such platforms. Often, users are left to recreate their own personal information among different platform operators to utilize features that are unavailable on one platform, but available on another platform.

In addition, the manner in which these platforms maintain and access a user's personal information using internal systems generally provides little or no transparency on how the data is maintained and inhibits the traceability of changes in personal information.

It is with respect to these and other considerations that the disclosure made herein is presented.

SUMMARY

The disclosed technology is directed toward a system for maintaining user personal information that is reliable, transparent and traceable and provides for user control over changes to and sharing of their personal information.

In one aspect of the technology, secure management of personal information data involves storing personal information data in a personal information data block and committing the personal information data block to a personal information data blockchain. Access to the personal information data by a platform entity is authorized storing a platform identifier corresponding to the platform entity in authorized access data. An access request is received from the platform entity that includes the platform identifier for the first platform entity. If the platform identifier is verified to be in the authorized access data, the personal information data is obtained from the personal information data blockchain and returned to the platform entity. Personal information data is added or modified by adding a change data block to the personal information data blockchain.

In another aspect of the disclosed technology, the authorized access data is secured on an authorized access data blockchain. The authorized access data is modified by adding an access data block to the authorized access data blockchain that adds or removes platform identifiers. Addition of a platform identifier to the authorized access data grants access to the personal information data for the corresponding platform entity. Removal of a platform identifier from the authorized access data revokes access to the personal information data for the corresponding platform entity.

In another aspect of the disclosed technology, the authorized access data can include permissions that identify portions of the personal information data that the platform entity can access. The permissions for a platform entity are stored in authorized access data with the platform identifier for the platform entity. When the platform entity requests access to the personal information data, the personal information data from the personal information data blockchain is filtered such that only the portions of the personal information data that are indicated by the permissions are returned to the platform entity.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 3B is a data architecture diagram showing an illustrative example of a personal information data block that includes code for storing, sharing and accessing personal information data on the personal information data blockchain;

FIG. 3C is a data architecture diagram showing another illustrative example of a personal information data block wherein the code for accessing personal information data on the personal information data blockchain decrypts a platform identifier for a platform requesting access;

FIG. 3D is a data architecture diagram showing yet another illustrative example of a personal information data block wherein the code for accessing personal information data on the personal information data blockchain filters the personal information data provided to a requesting platform based on permissions defined for the requesting platform;

DETAILED DESCRIPTION

Figure 1:
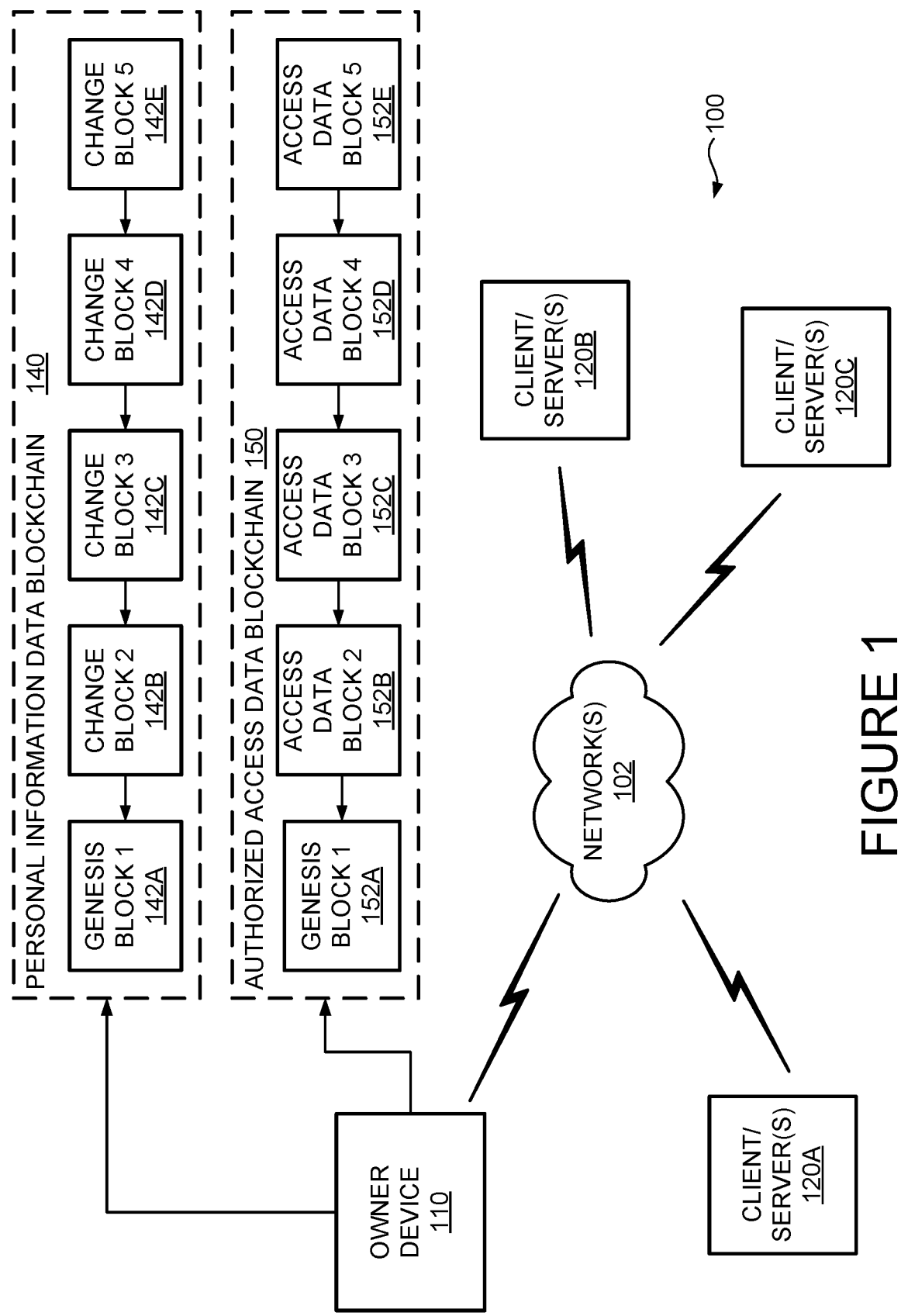
FIG. 1 is an architectural diagram showing an illustrative example of a system for a personal information data blockchain and an authorized access data blockchain.

The following Detailed Description describes technologies for the use of blockchaining in a personal information management system that maintains a user's personal information on a blockchain and permits the user to control changes to the personal information and sharing of the personal information.

Personal information data is securely maintained on a blockchain by a user. For example, a blockchain smart contract, such as an ETHEREUM blockchain smart contract, contains methods for a user to store and share the user's personal information with one or more cooperating parties, such as a social media platform operator, a digital content provider, a party to a transaction, a healthcare provider, a potential employer, a government agency, a school administrator, a media outlet, a digital advertiser, or an online seller.

In one illustrative implementation, one or more available methods or mechanisms can be used to define platforms that are authorized to access the personal information data in authorized access data that is secured on an authorized access data blockchain. In another illustrative implementation, one or more available methods or mechanisms can be used to define permissions defining selected portions of the personal information data that an authorized platform can access. In still another illustrative implementation, one or more available methods or mechanisms can be used that secure both the personal information data and the authorized access data on the personal information data blockchain.

The user can set one or more selected conditions in the smart contract for the storage and sharing of personal information. The user's personal information can be stored as part of the smart contract blockchain according to the one or selected conditions and shared with one or more cooperating parties according to the one or more sharing conditions.

In an illustrative implementation, the user's personal information can include, but is not limited to, user profile information, user preferences for one or more products or services, user healthcare information, user employment history information, user resume or curriculum vitae information, user purchase history information, and user criminal history information, user academic information, or user reputational information.

A user generates a data block in a personal information data blockchain for storing their personal information. The personal information can be encrypted by the user to prevent unauthorized access to the user's information. To add or modify personal information data, the user generates another data block in the personal information data blockchain that includes the added or modified personal information data.

The user can define an authorized access list defining access to the personal information data blockchain. In some examples, the user generates a data block in an authorized access data blockchain for storing the authorized access data that includes an identifier for one or more platforms that have authorized access. The authorized access data can include permissions that determine which select portions of the personal information that each platform can access. To add or modify authorized access data, the user generates another data block in the authorized access data blockchain that includes the added or modified authorized access data.

A technical advantage of the use of a blockchain for storing personal information data and authorized access data includes security of the data, because the data is stored on a blockchain, which protects the personal information data from unauthorized modification and provides for traceability of modifications. Another technical advantage is that the personal information data and authorized access data can be stored in a decentralized manner, which prevents the data from being corrupted by damage or modification to any one copy of the data. Still another technical advantage is that access to the personal information data can be terminated by changing authorized access data that defines the platform entities that can access the personal information data. Yet another technical advantage is that greater transparency can be achieved when the code utilized to store, share and access the personal information data can be made viewable in the personal information data block or smart contract.

The disclosed technology can provide transparency, traceability and security for personal information data and processes used in storing, maintaining and sharing personal information data.

In certain simplified examples, a method, system or computer readable medium for secure management of personal information involves an owner of personal information securely storing personal information on a personal information blockchain. The owner creates a block containing personal information data and commits the block to the personal information blockchain, where it is verified by the blockchain platform for the personal information blockchain. To add, delete or modify personal information data, the owner creates another block containing the modified personal information data and commits the block to the personal information blockchain. The history of modifications to the personal information data can be traced through the blocks committed to the personal information blockchain.

The technology can include defining authorized access data that determines access to the personal information data on the personal information blockchain and securing the authorized access data in an authorized access data blockchain. These examples involve the owner defining an entry for each platform entity in authorized access data, which is secured on an authorized access data blockchain. The owner creates a block containing authorized access data and commits the block to the authorized access blockchain, where it is verified by the blockchain platform for the authorized access blockchain. To add, delete or modify authorized access data, the owner creates another block containing the modified authorized access data and commits the block to the authorized access blockchain. The history of modifications to the authorized access data can be traced through the blocks committed to the authorized access blockchain.

In some examples, the data blocks or smart contracts for the personal information include script code for methods for accessing the personal information data. A platform seeking access to the personal information data invokes an access method in the personal information data block and includes a platform identifier for the platform. The access method searches the authorized access data blockchain for an entry in the authorized access data corresponding to the platform identifier. If no corresponding entry is found, then the access request is rejected. If an entry for the platform is found in the authorized access data blockchain, then the access method provides the personal information data to the platform. Access to the personal information data can be controlled by adding or deleting entries in the authorized access data on the authorized access data blockchain.

In some examples, the owner may define selective permissions for a platform entity, where the permissions determine selected portions of the personal information data to which the platform entity is authorized to access. The owner defines the permissions in the entry for a platform entity. The access method obtains the permissions for the platform entity when is searches for an entry in the authorized access data corresponding to the platform entity. The access method filters the personal information data based on the permissions for the platform entity and provides to the platform entity only the personal information data to which the platform entity is allowed access in the permissions. The permissions for a platform entity may be modified by the owner adding a new block to the authorized access data blockchain that contains the modified permissions.

Another example of the disclosed technology includes a feature for working with data and smart contract code included in two separate blockchains. As just one example, an intermediate computing node may intermediate trusted messages between a personal information data blockchain and an authorized access data blockchain. The two blockchains may be based on the same technology or different technology, and each blockchain may employ different scripting languages. A technical advantage of the disclosed technology includes the ability to work across a disparate set of blockchains, each blockchain including valuable data and smart contract logic to be used in managing personal information data, yet allowing for resulting data using smart contracts and data from all of the types of blockchain. By configuring the blockchains according to the disclosed technology, a technical advantage includes managing personal information data from disparate blockchain sources that may be combined using the disclosed technology.

These are simplified examples and many factors may be considered in a system for maintaining personal information data using a blockchain as will be discussed in greater detail below.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of personal information data or authorized access data pertaining to the personal information data.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

By the use of the technologies described herein, a personal information data blockchain is used to maintain personal information data. In addition, an authorized access data blockchain can be used to maintain authorized access data identifying platform entities that are permitted to access the personal information data on the personal information data blockchain. The personal information data blockchain accesses the authorized access data blockchain to validate that a platform entity seeking access to the personal information data is identified in the authorized access data. Code for storing, sharing and accessing personal information data can be included in the personal information data blocks of the personal information data blockchain. Other technical effects other than those mentioned herein can also be realized from implementation of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for secure management of personal information data using a personal information data blockchain will be described. As will be described in more detail below with respect to the figures, there are a number of applications and services that may embody the functionality and techniques described herein.

FIG. 1 is an architectural diagram showing an illustrative example of a personal information data management system 100 utilizing a personal information data blockchain 140 to securely maintain and share personal information data. In FIG. 1, two separate blockchains are employed, personal information data blockchain 140 and authorized access data blockchain 150. Owner device 110, which can be a client, a server, or a remotely resourced computer system, or a distributed blockchain platform, which can include multiple client or server devices 120, may intermediate messages and signals between the blockchains 140 and 150. In the embodiment of FIG. 1, the blockchains 140 and 150 may be of the same type, such as based on ETHEREUM, but they may also be of different types—as just one example, blockchain 140 may be based on the script language for BITCOIN, called SCRIPT and the blockchain 150 may be based on a scripting language for ETHEREUM, such as SOLIDIFY.

Owner device 110 initiates personal information data blockchain 140 by creating genesis block 142A and initiates authorized access data blockchain 150 by creating genesis block 152A. Genesis block 142A can include the personal information data belonging to a user of owner device 100. Genesis block 152A can include data identifying one or more platforms that are permitted to access the data stored on personal information data blockchain 140. In other embodiments, the owner device 110 may be replaced by another computing node, such as a computer on a peer-to-peer network, or other computing device.

In the example of FIG. 1, the information in authorized access data blockchain 150 stores a platform identifier for each of the one or more of client/servers 120A, 120B or 120C that are granted access to the user's personal information data stored on personal information data blockchain 140. The client/servers 120 can communicate with owner device 110 as well as a network of servers that support and maintain blockchains 140 and 150. For example, the ETHEREUM blockchain platform from the ETHEREUM FOUNDATION of Switzerland provides a decentralized, distributed computing platform and operating system that provides scripting functionality.

Owner device 110 controls the authorized access data in authorized access data blockchain 150 and can revise the authorized access data by submitting new or revised authorized access data in change blocks 152B, 152C, 152D and 152E in this example. Though owner device 110 maintains control over changes to the authorized access data blockchain 150, the authorized access data can be made accessible to other entities. For example, authorized access data blockchain 150 may be viewable to the public through the use of applications that can access blockchain information. Or, in another example, the authorized access data blockchain 150 may be restricted to being viewable only to client/servers 120 that are identified as authorized platforms in blockchain 150. By providing access to the authorized access data blockchain 150, this approach can provide full or partial transparency to the identity of the authorized platforms.

In another example, the authorized access data can be stored in the personal information data blockchain 140. In this example, both personal information data and authorized access data reside in personal information change data blocks 142. When either personal information data or authorized access data changes, the owner device 110 can create a personal information change data block with the data changes and commit the personal information change data block to the personal information data blockchain 140.

Figure 2A:
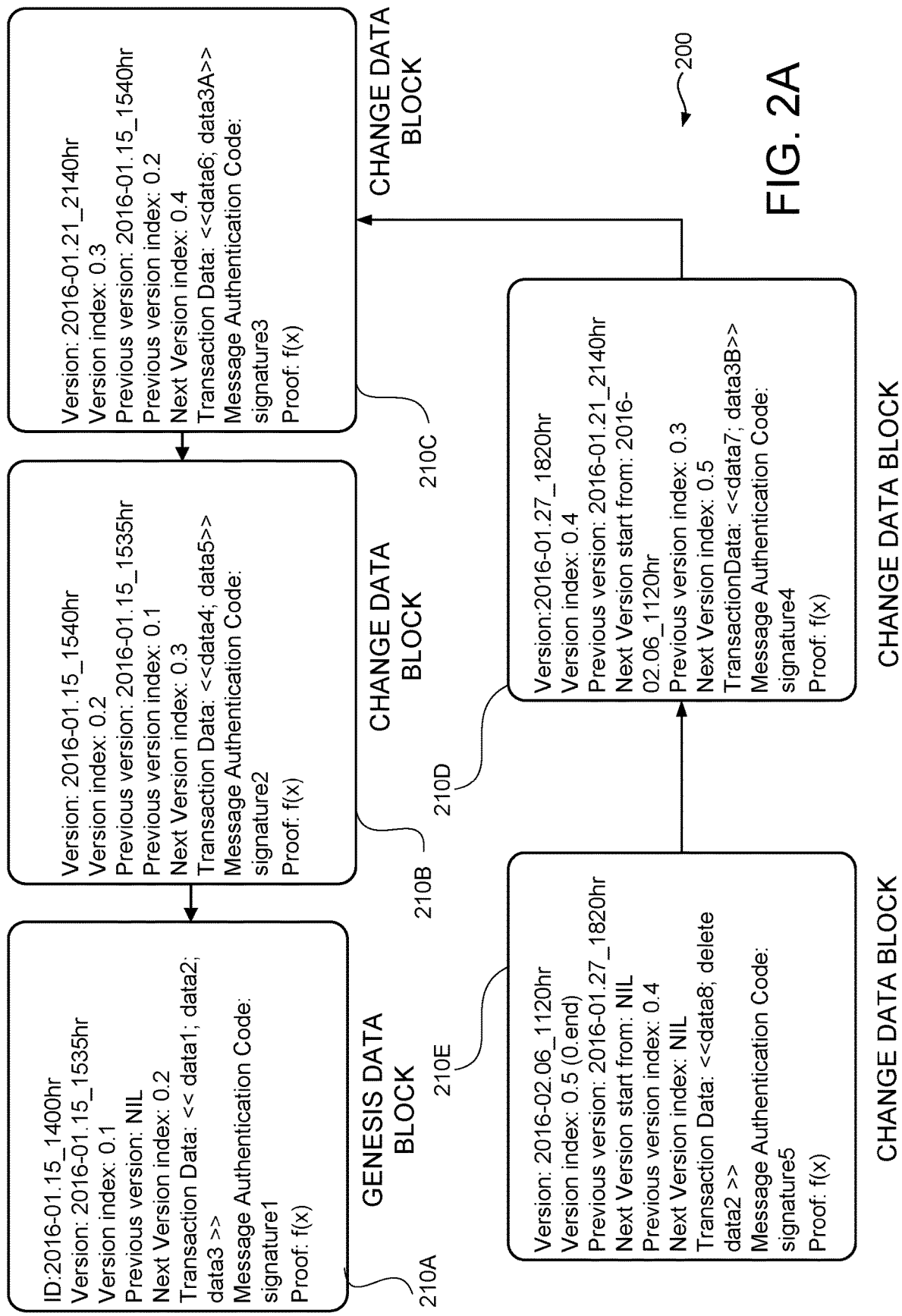
FIG. 2A is a data architecture diagram showing an illustrative example of a personal information data blockchain with personal information data being added or modified and the changes are secured with a new change data block on the blockchain.

FIG. 2A is a data architecture diagram illustrating a simplified example of a personal information data blockchain ledger 200 based on the blocks 142A-E of the personal information data blockchain ledger 140 of FIG. 1. The personal information data blockchain ledger 200 example of FIG. 2A is simplified to show block headers, metadata and signatures of blocks 210A-E in order to demonstrate secure, shareable and traceable storage of personal information data using a blockchain. In outline, a blockchain ledger may be a globally shared transactional database.

The blockchain ledger 200 may be arranged as a Merkle tree data structure, as a linked list, or as any similar data structure that allows for cryptographic integrity. The blockchain ledger 200 allows for verification that data has not been corrupted or tampered with because any attempt to tamper will change a Message Authentication Code (or has) of a block, and other blocks pointing to that block will be out of correspondence. In one embodiment of FIG. 2A, each block may point to another block. A block may comprise one or more transactions. Each block may include a pointer to the other block, and a hash (or Message Authentication Code function) of the other block.

Each block in the blockchain ledger may optionally contain a proof data field. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate 10*10=100 time units have accrued. A proof of research may indicate that research has been performed. In one example, a proof of research may indicate that a certain amount of computational work has been performed—such as exploring whether molecules interact a certain way during a computational search for an efficacious drug compound.

The blocks 210 of personal information data blockchain 200 in the example of FIG. 2A show personal information data being added or modified and the changes are secured with a new change data block on the blockchain. In this example, owner device 110 of FIG. 1 identifies three items of personal data, e.g. data1, data2 and data3 when it creates genesis data block 210A. The owner device 110 signs the genesis data block 210A and the blockchain system within which blockchain 200 is created verifies the genesis data block based on a proof function.

To modify the personal information data blockchain 200, owner device 110 creates change data block 210B, which adds two additional data items, data4 and data5. The owner device 110 signs change data block 210B and commits the block to blockchain 200 for verification by the blockchain platform. Similarly, owner device 110 creates change data block 210C to add data6 and to modify the value of data3 to a new value data3A. Likewise, change data block 210D is created to added data7 and to modify the value of data3 to yet another new value data3B. Further, change data block 210E is created to introduce data8 and to delete data2. In this approach the overall personal information data is obtained by tracing the change data blocks back to the genesis data block 210A for the personal information data blockchain 200.

Figure 2B:
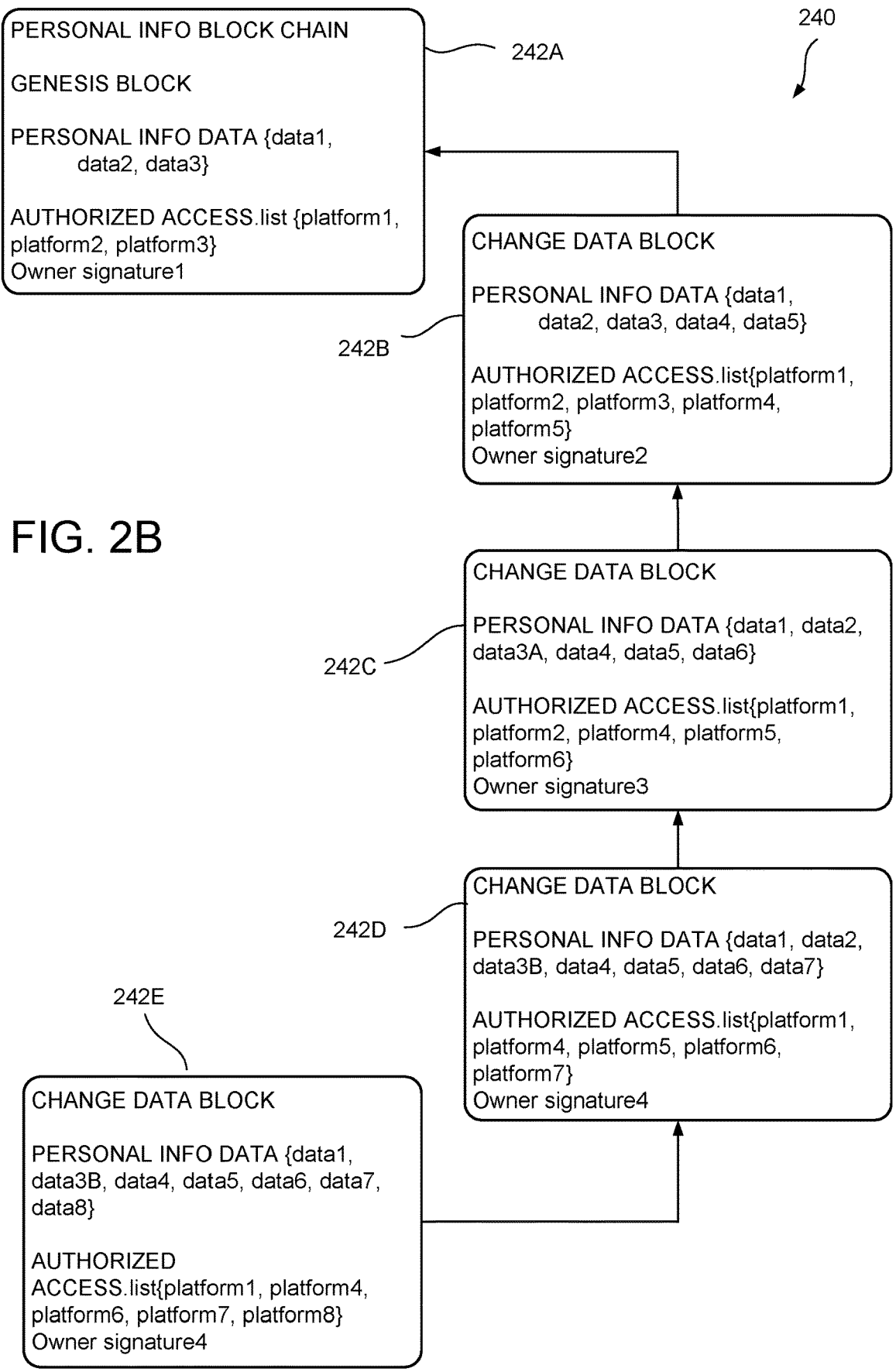
FIG. 2B is a data architecture diagram showing another illustrative example of a personal information data blockchain where each block on the blockchain includes a complete list of personal information data and a complete list of platforms with authorized access.

Note that the personal information data and the authorized access data can, in some examples, be combined in the same blockchain data blocks. FIG. 2B is a data architecture diagram showing another illustrative example of a personal information data blockchain 240 where each data block 242 on the personal information data blockchain includes a complete list of personal information data and a complete list of platforms with authorized access. To modify either the personal information data or the authorized access data, owner device 110 creates a change data block 242 to add or modify the personal information data or the authorized access data. For example, change data block 242B adds data4 and data5 to the personal information data and adds platform4 and platform5 to that authorized access list. Similarly, change data block 242C modifies data3 to data3A and adds data6 to the personal information data and removes platform3 and adds platform6 to the authorized access list. In this example, each change data block 242 is committed to the personal information data blockchain 240 to secure both the personal information data and the authorized access data in the same blockchain. Management of the personal information data and the authorized access data in this form can be achieved through corresponding modification of the methods and mechanisms described herein. It will be readily recognized that many variations on the examples shown can be utilized that are consistent with the disclosed technology.

Figure 2C:
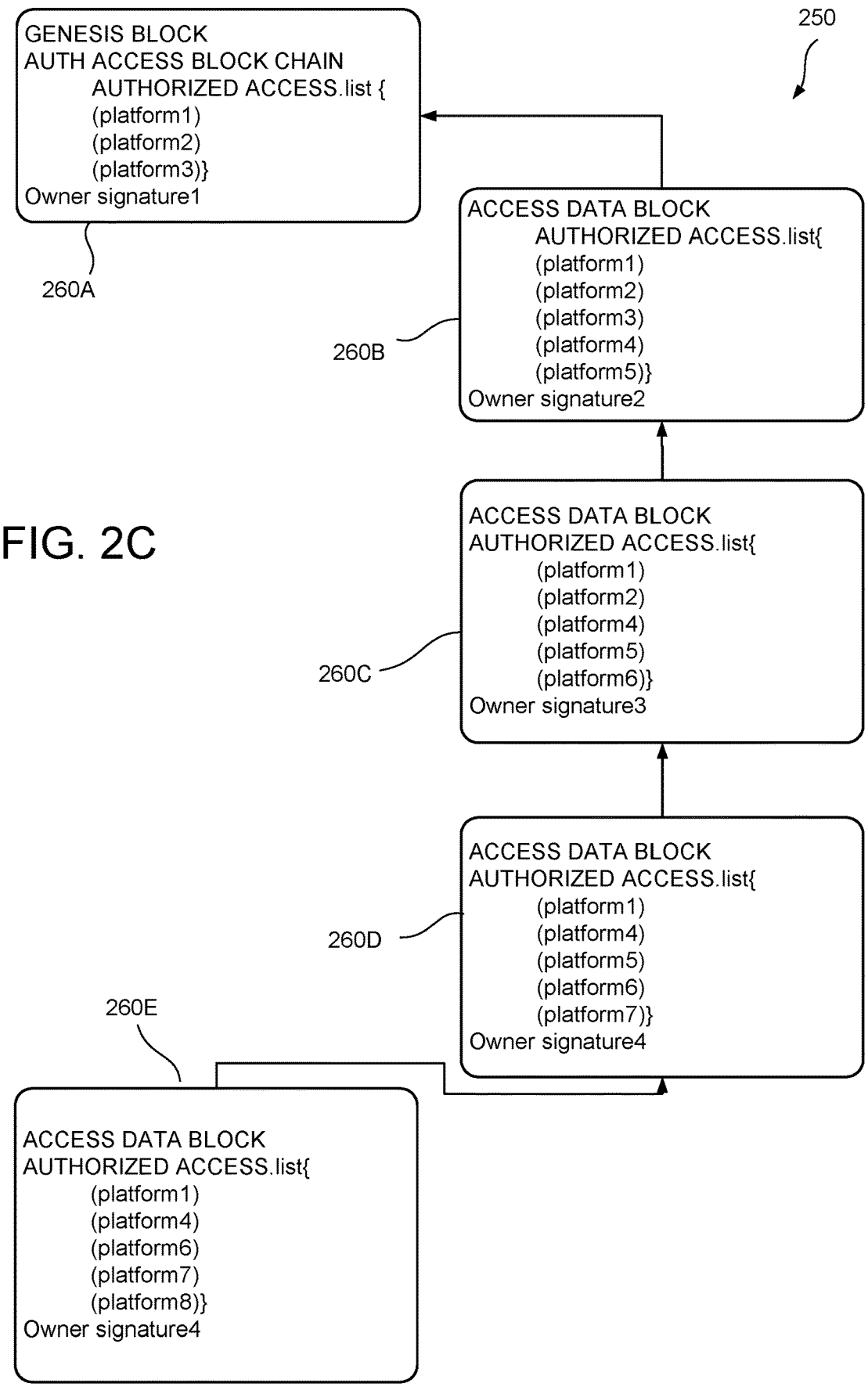
FIG. 2C is a data architecture diagram showing an illustrative example of an authorized access data blockchain where each block on the blockchain includes a complete list of platforms with authorized access.

FIG. 2C is a data architecture diagram showing an illustrative example of an authorized access data blockchain 250 wherein each data block 260 on the blockchain 250 includes a complete list of authorized platform identifiers. In this approach, the list of authorized access platforms identified in genesis block 260A is: (platform1); (platform2); and (platform3).

To add platforms to the authorized access list, owner device 110 creates change data block 260B, which adds two platforms by listing: (platform1); (platform2); (platform3); (platform4); and (platform5). Change data block 260C terminates the access of platform3 by removing the (platform3) entry from the list and adds (platform6) to the authorized access list. Similarly, change data block 260D terminates the access of platform2 by removing the (platform2) entry from the list and adds (platform7). Finally, change data block 260E adds (platform8). Each of the data blocks 260 is signed by the owner device 110 and committed to the blockchain 250 for verification by the blockchain platform.

Note that the authorized access list may be managed by including merely the modifications to the authorized access list in each change data block and obtaining the complete authorized access list by tracing from the most recent change data block back to the genesis block for the blockchain. Generally, such a modification based approach requires more computation resources while the approach of FIG. 2C utilizes more data storage resources. A variety of approaches may be utilized that are consistent with the present approach.

Figure 2D:
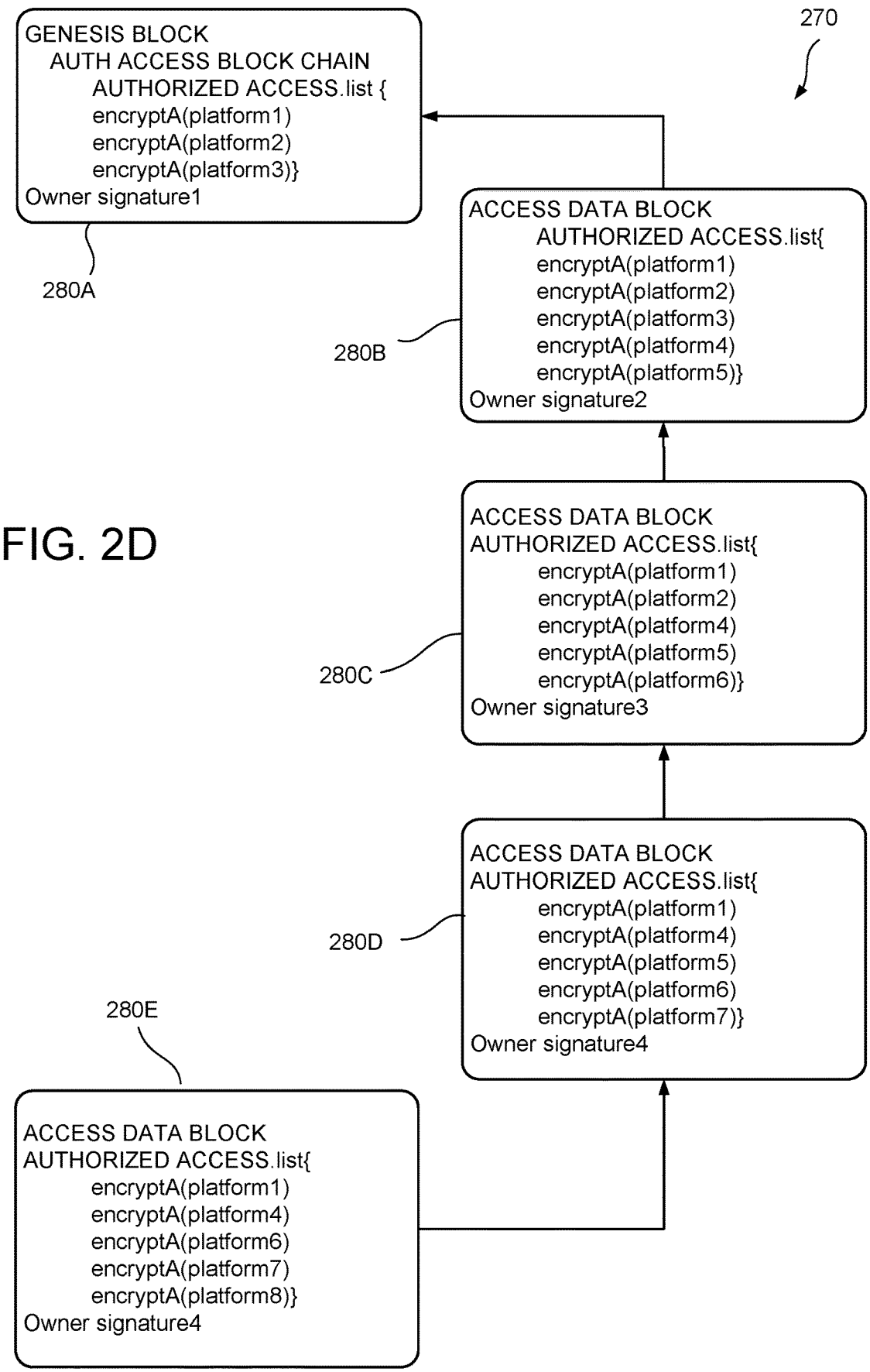
FIG. 2D is a data architecture diagram showing yet another illustrative example of an authorized access data blockchain where each block on the blockchain includes a complete list of platforms with authorized access where the platform identifier values are encrypted.

FIG. 2D is a data architecture diagram showing an illustrative example of an authorized access data blockchain 270 wherein each data block 280 on the blockchain 270 includes a complete list of authorized platform identifiers in encrypted form. In this example, each platform identifier in the list of authorized access platforms is encrypted using one key of an asymmetric key pair, e.g. the platforms identified in genesis block 280A are: encryptA(platform1); encryptA (platform2); and encryptA(platform3). The owner could provide each platform authorized to access the personal information data the other key of the asymmetric key pair, which the platform would use to encrypt its platform identifier, e.g. encryptB(platform1), and include its encrypted platform identifier in its request for access. This example demonstrates an approach with an additional layer of security for the authorized access list. Other variations can be utilized that are consistent with the present technology.

Figure 2E:
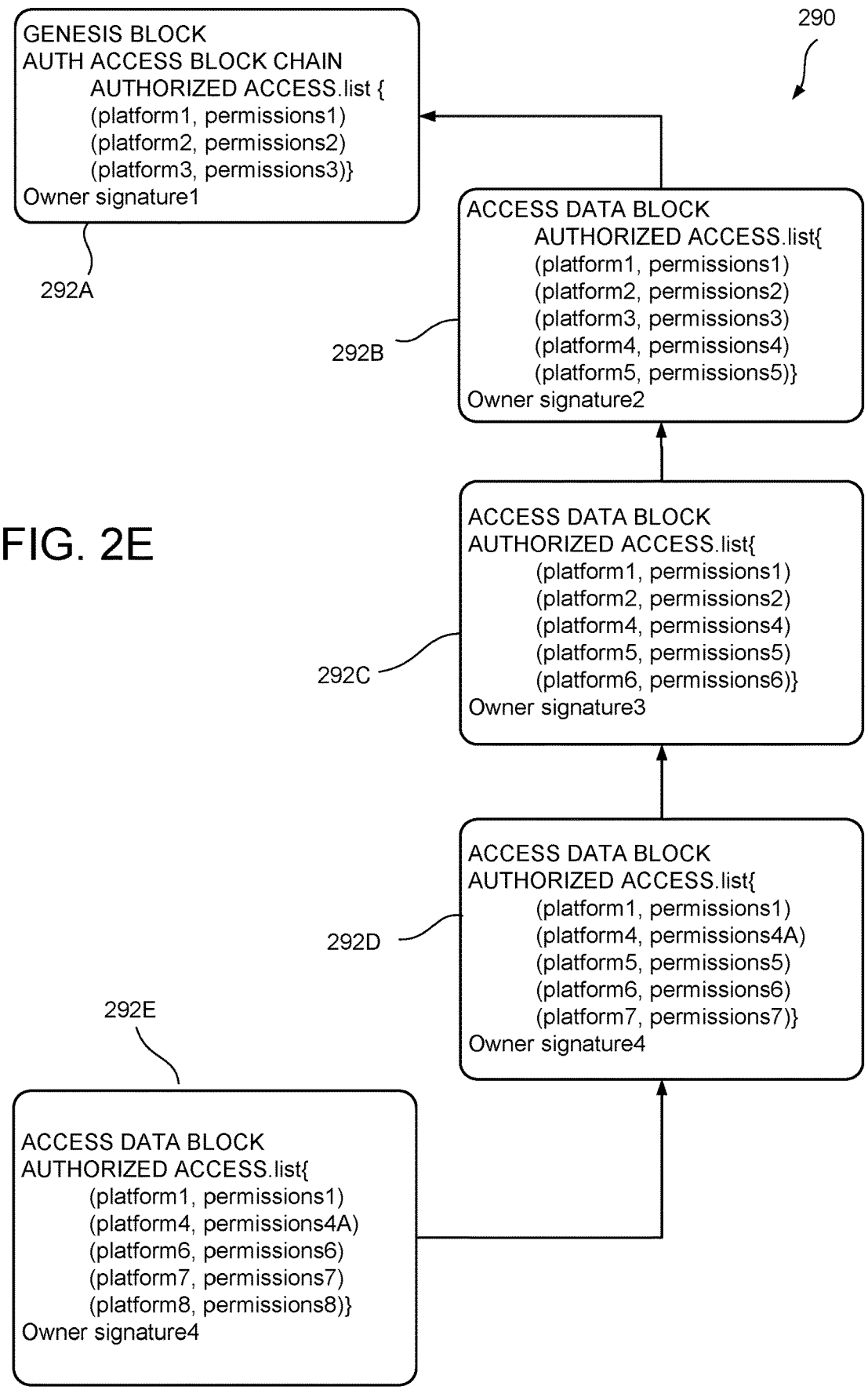
FIG. 2E is a data architecture diagram showing still another illustrative example of an authorized access data blockchain where each block on the blockchain includes a complete list of platforms along with permissions for authorized access to selected personal information data.

FIG. 2E is a data architecture diagram showing an illustrative example of an authorized access data blockchain 290 wherein each data block 292 on the blockchain 290 includes a complete list of authorized platform identifiers along with corresponding permissions for each platform. The permissions identify the parts of the personal information data that the platform has authorization to access. In this example, the list of authorized access platforms and permissions identified in genesis block 292A is: (platform1, permissions1); (platform2, permissions2); and (platform3, permissions3).

To add platforms to the authorized access list, owner device 110 creates change data block 260B, which adds two platforms by adding (platform4, permissions4) and (platform5, permissions5) to the list. Change data block 260C terminates access for platform3 by removing it from the list and adds (platform6, permissions6) to the authorized access list. Similarly, change data block 260D terminates the access of platform2 by removing it from the list, modifies the permissions for platform4 by placing (platform4, permissions4A) in the list, and adds (platform7, permissions7). Finally, change data block 260E adds (platform8, permissions8). Each of the data blocks 292 is signed by the owner device 110 and committed to the blockchain 290 for verification by the blockchain platform.

Figure 3A:
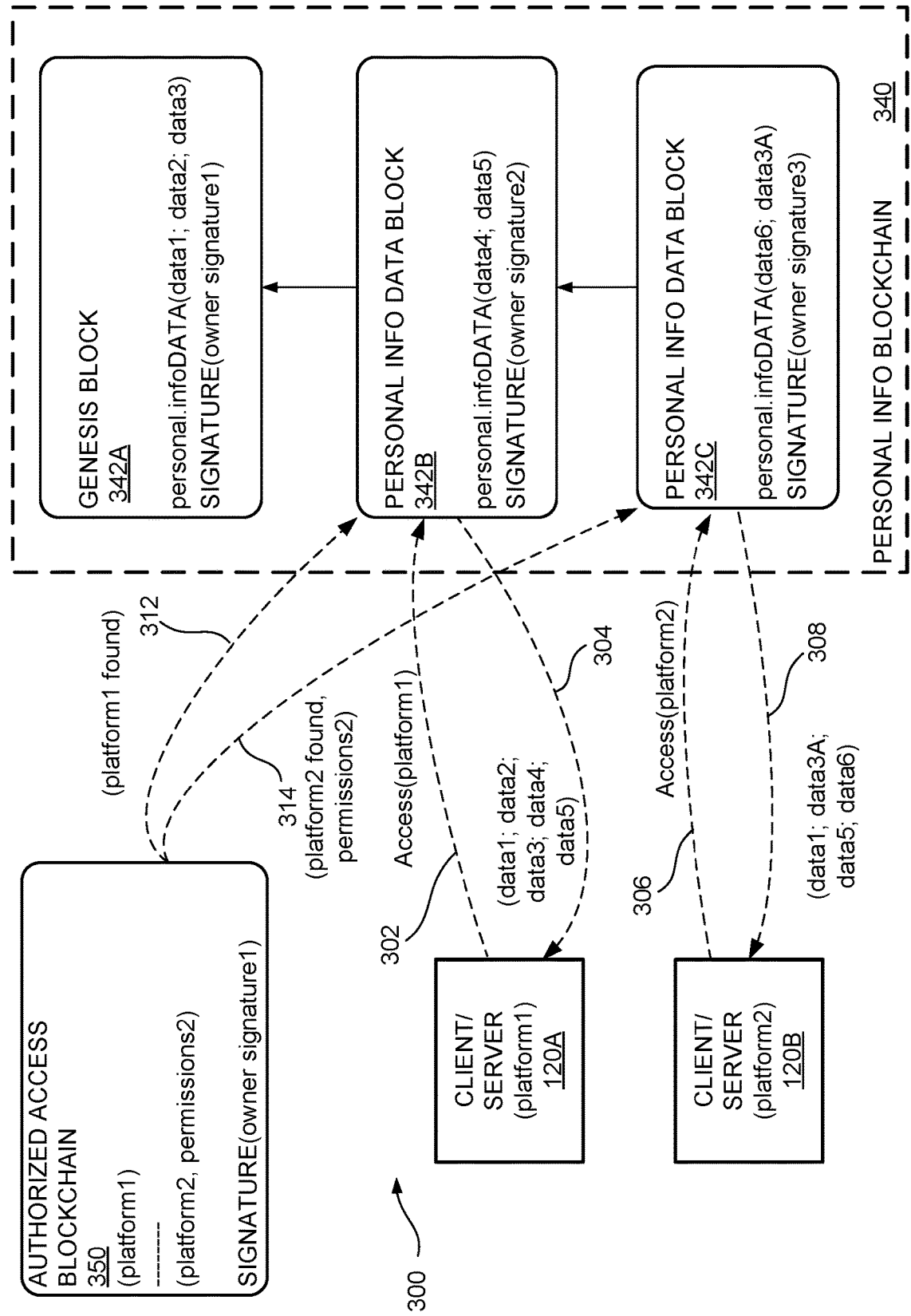
FIG. 3A is a data architecture diagram showing an illustrative example of scenarios involving a personal information data blockchain with platforms requesting access to the personal information data being validated against authorized access data in the authorized access blockchain.

The authorized access data from the authorized access data blockchain 150 is utilized to control access to the personal information in personal information data blockchain 140 by validating that a platform is identified in the authorized access data before releasing personal information data to that platform. FIG. 3A is a data architecture diagram 300 demonstrating two illustrative examples: one example where the authorized access list contains just platform identifiers, such as the authorized access data shown in FIG. 2C, and a second example where the authorized access list contains permissions in addition to platform identifiers, such as the authorized access data shown in FIG. 2E.

In the first example, at 302, client/server device 120A invokes an ACCESS script in personal information data block 342B to obtain access to the personal information data and provides its platform identifier, platform1. Note that this example assumes that personal information data block 342C has not yet been added to personal information data blockchain 340. The ACCESS script from personal info data block 342B searches the authorized access data blockchain 350 for an entry corresponding to platform1, which is found at 312. Because platform1 is found in the authorized access data, the ACCESS script releases, at 304, all the personal information in the personal information data blockchain, as it exists at that point, to client/server 120A, which includes personal information data1, data2, data3, data4 and data5.

The second example involves the use of permissions data defined for a platform in determining whether to release personal information data to a platform and what parts of the personal information data can be released to the requesting platform. This example assumes that personal information data block 342C has been added to the personal information data blockchain 340. At 306, client/server device 120A invokes an ACCESS script in personal information data block 342C to obtain access to the personal information data and provides its platform identifier, platform2. The ACCESS script from personal info data block 342C searches the authorized access data blockchain 350 for an entry corresponding to platform2, which is found at 314 along with the permissions defined for platform2, e.g. permissions2. The ACCESS script performs filtering the personal information data based on the permissions2, which determine which parts of the personal information data to release to platform2. In this example, the permissions2 indicate that platform2 is only authorized to access data1, data3A (the value of data3 as modified to data3A in block 342C), data5 and data6. Because platform2 is found in the authorized access data, the ACCESS script, at 308, releases only the personal information data in the personal information data blockchain, as it exists at that point, that platform2 is authorized to access to client/server 120B, which includes personal information data1, data3A, data5 and data6. It will be appreciated that a variety of approaches to identifying permissions can be utilized with the present technology.

The ACCESS script is secured by the personal information data blockchain 340 and executed by the operating system of the decentralized, distributed blockchain platform. FIG. 3B is a data architecture diagram showing an illustrative example of a personal information data block 342 that includes code or scripts for storing, sharing and accessing personal information data on the personal information data blockchain.

In this example, the STORE.PERSONAL.INFORMATION script is called by the owner device 110 for the owner of the personal information to store personal information data, personal.infoDATA, on the personal information data blockchain, e.g. by creating a genesis block or a change data block containing the personal information data. The SHARE script is called by the owner to share the personal information data on the personal information data blockchain with a platform. The SHARE script, in one example, creates a genesis block or a change data block containing the authorized access data on the authorized access data blockchain. The platformID is identified as a recipient for the data and person.infoID.data is set to "share" to permit the personal information data to be shared with the platform. The ACCESS script, in this example, is called by a platform seeking to access the personal information data and providing a platform identifier platformID. The ACCESS method searches the authorized access data blockchain for an entry corresponding to the platformID and, if found and personal.infoID.data is set to "share", the personal.infoDATA is returned to the requesting platform.

FIG. 3D is a data architecture diagram showing an illustrative example of a personal information data block 372 that includes code or scripts for storing, sharing and accessing personal information data on the personal information data blockchain, but where the owner defines permissions that determine which portions of the personal information data that a platform can access. The SHARE script is called by the owner to authorize a platform identified by platformID to access portions of the personal information data determined by the permissions value. The ACCESS script uses the permissions corresponding to the platformID to filter the personal information data released to the platform. When the ACCESS script searches the authorized access data blockchain using the platformID and obtains the corresponding permissions. The personal information data is filtered using the permissions to include only the authorized data authDATA for the platform. The authorized data is then returned to the platform.

The scripts illustrated in FIGS. 3B, 3C and 3D above are simplified examples. A variety of other approaches can be utilized to implement the techniques of the present technology.

Figure 4A:
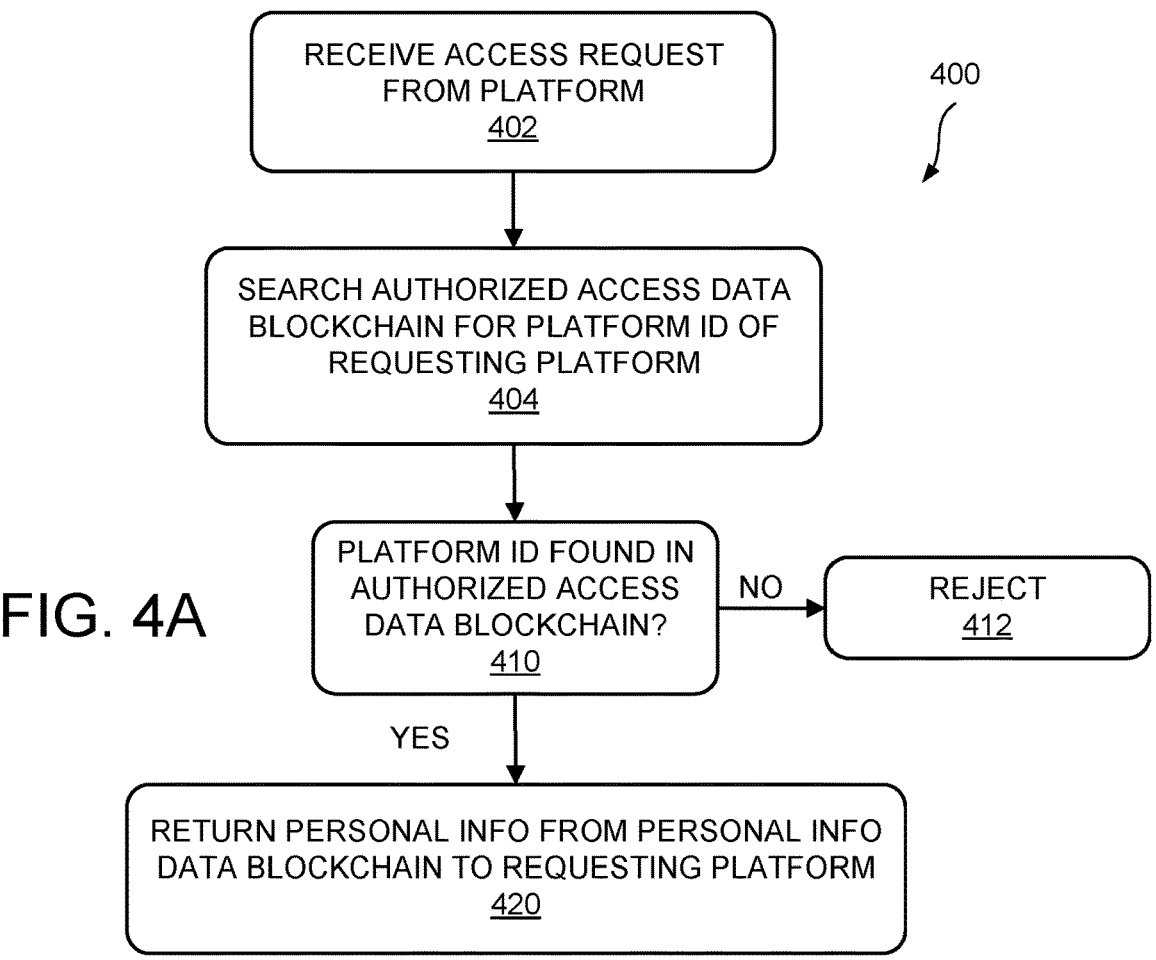
FIG. 4A is a control flow diagram showing an illustrative example of a process for validating a requesting platform against an authorized access data blockchain.

FIG. 4A is a control flow diagram showing an illustrative example of a process 400 for accessing personal information data in accordance with the present technology, such as the ACCESS scripts illustrated above. At 402, an access request is received from a platform that includes a platformID. At 404, an authorized access data blockchain, such as those shown above, is searched using the platformID of the requesting platform.

At 410, if an entry corresponding to platformID is not found, then control branches to 412 and the request is rejected. Note that in some implementations, an entry for the platformID may exist, but the permissions associated with the platformID indicate that it is not authorized to access the personal information data, which can also result in rejection of the access request. If, at 410, an entry for the platformID is found, then control branches to 420 and the personal information data from the personal information data blockchain is returned to the requesting platform.

Figure 4B:
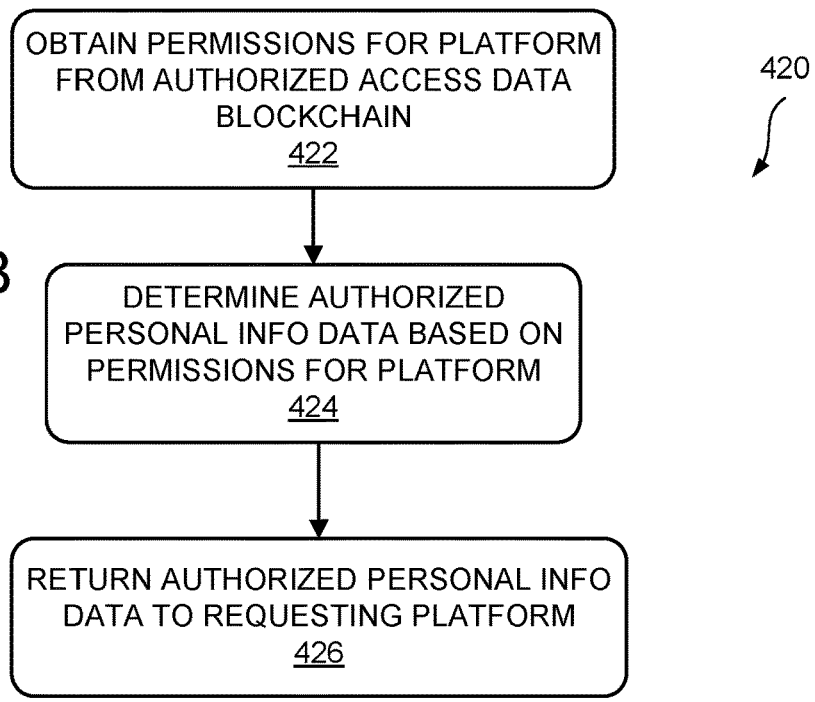
FIG. 4B is a control flow diagram showing an illustrative example of a process that obtains permissions defined for a requesting platform from an authorized access data blockchain and filters the personal information data provided to the requesting platform based on the permissions.

As noted above, some examples may implement permissions that give access only to selected portions of the personal information data as determined by the permissions defined by the owner for a given platform. FIG. 4B is a control flow diagram showing one illustrative example of operation 420 of FIG. 4A where permissions are utilized. At 422, the permissions corresponding to a platformID are obtained from the authorized access data blockchain. At 424, the personal information data for the platform is determined based on the permissions for the platformID. At 425, only the authorized personal information data is returned to the requesting platform corresponding to the platformID.

Figure 4C:
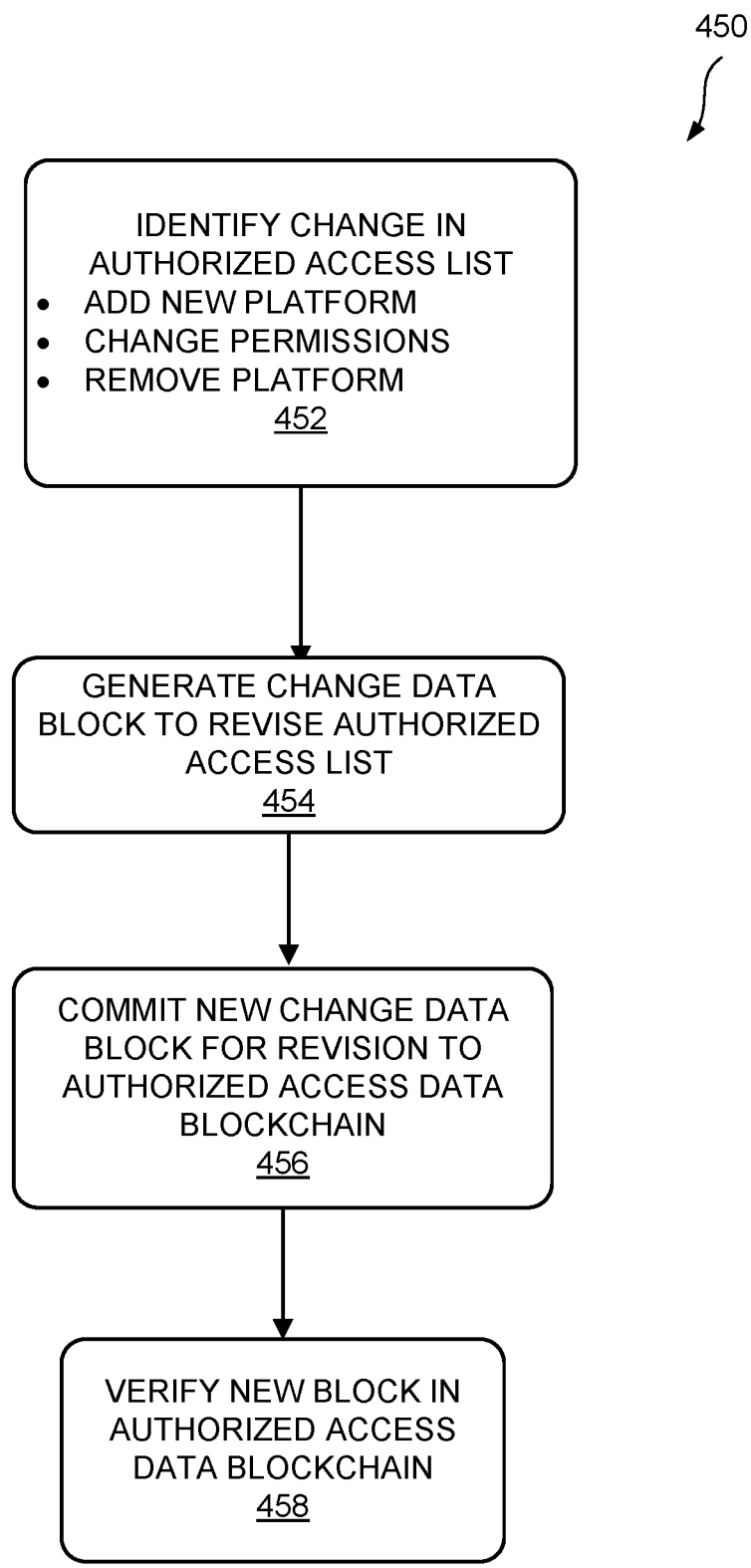
FIG. 4C is a control flow diagram showing an illustrative example of a process for revising an authorized access list and securing the revisions to authorized access list on the authorized access data blockchain.

FIG. 4C is a control flow diagram showing an illustrative example of a process 450 for revising authorized access data stored on an authorized access data blockchain, such as the authorized access data blockchains illustrated in FIG. 1, 2C, 2D, 2E, or 3A. For example, process 450 may be initiated by invocation of the SCRIPT code described above with respect to FIGS. 3B, 3C and 3D. At 452, a change to the authorized access data is identified, such as adding or removing access for a platform or changing permissions for a platform. At 454, a change data block for the authorized access data blockchain is created to revise the authorized access list. Note that a genesis block for the authorized access data blockchain may be generated at this point if the authorized access data blockchain had not yet been created.

At 456, the new change data block for the revision of the authorized access data is committed to the authorized access data blockchain. At 458, the new change data block is verified by the blockchain platform supporting the authorized access data blockchain.

Figure 4D:
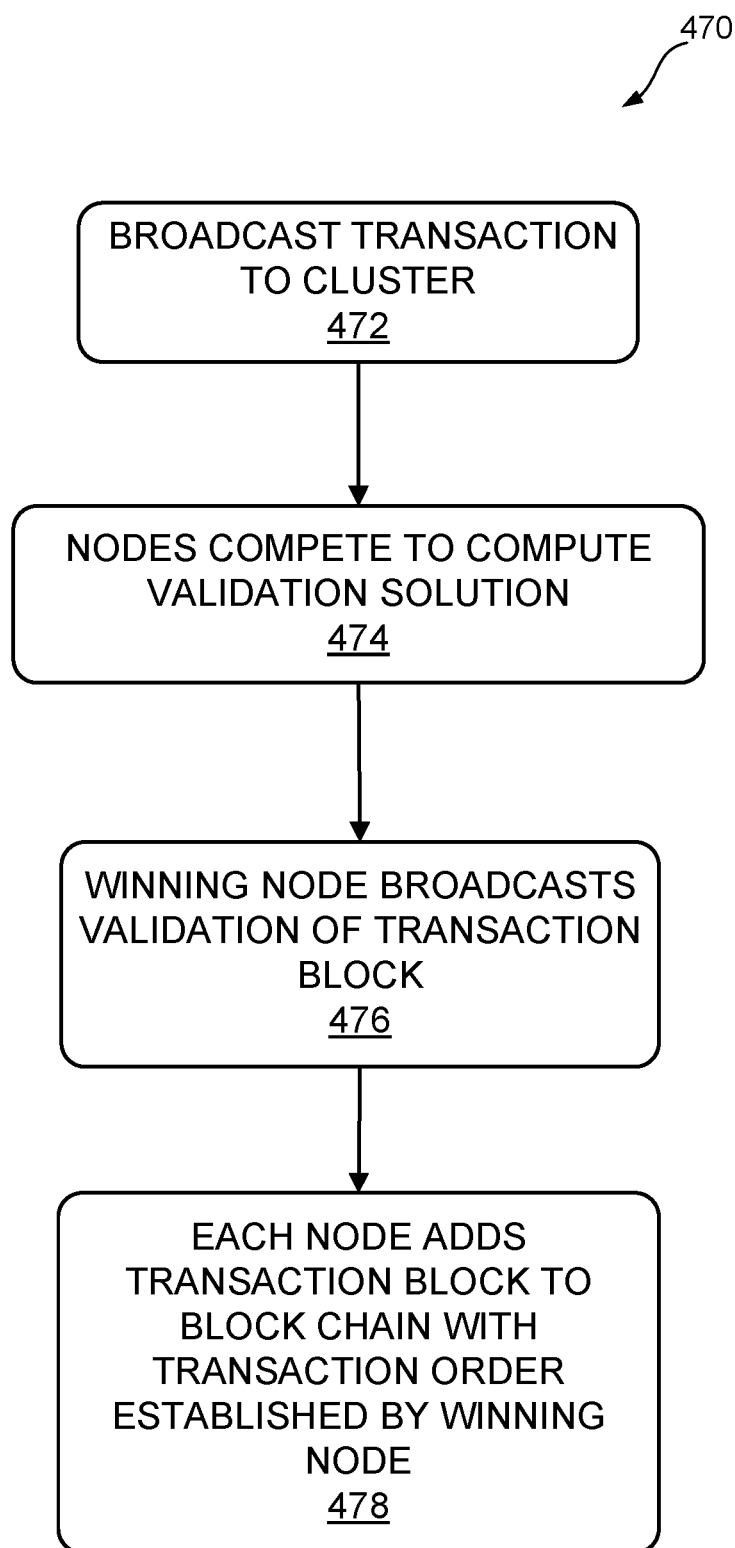
FIG. 4D is a control flow diagram illustrating an example of a validation process for blocks added to the personal information and authorized access data blockchain ledgers distributed to untrusted nodes.

FIG. 4D is a control flow diagram illustrating an example of a validation process 470 for blocks added to the personal information data and authorized access data blockchain ledgers distributed to untrusted nodes. In process 470, when a change data block 142 is created for a personal information data blockchain 140 transaction or an access data block 152 is created for an authorized access data blockchain 150 transaction, the transaction is broadcast, at 472, to the cluster of untrusted nodes. At 474, nodes compete to compute a validation solution for the transaction. At 476, a winning node broadcasts the validation solution for the transaction block and adds the transaction block to its copy of the personal information data or authorized access data blockchain ledger. At 478, in response to the winning node's broadcast, the other nodes add the transaction block to their copies of the personal information or authorized access data blockchain ledger in the transaction order established by the winning node. The decentralized validation protocol can maintain the integrity and security of the personal information and authorized access data blockchain ledgers.

The disclosed technology is useful for many real-world scenarios. For example, owner device 110 may be controlled or operated by an individual, organization or other entity who desires to share some or all of their personal information data with selected platforms. An authorized access data blockchain may be utilized by the individual to control access to personal information data secured on a personal information data blockchain.

Access to the content of the personal information data blockchain or the authorized access data blockchain may be handled in a variety of ways. For maximum transparency, the authorized access data blockchain may be initiated on a public blockchain with the data being available to any person who can access the blockchain. For example, the authorized access data blockchain may be publicly accessible, but the personal information data blockchain is restricted. Or the authorized access data blockchain may be configured to encrypt the data and restrict access so that the authorized access list is not publicly viewable.

It should be appreciated that the utilization of blockchain technology, such as scripting technology within smart contracts, in this context provides a high degree of flexibility and variation in the configuration of implementations without departing from the teachings of the present disclosure.

Figure 5:
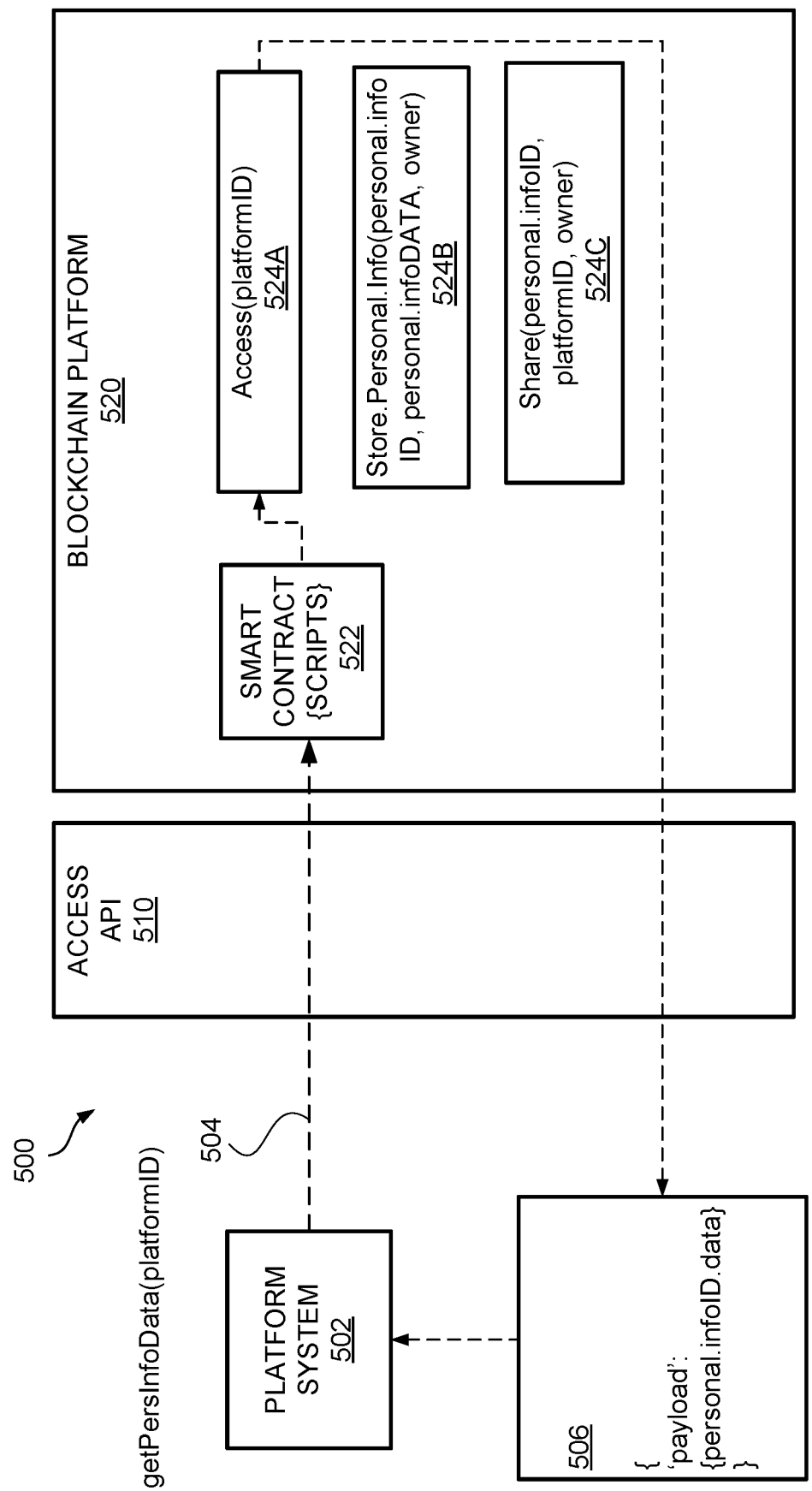
FIG. 5 is a data architecture diagram showing an illustrative example of a user accessing information from the personal information data blockchain using an application programming interface.

FIG. 5 is a data architecture diagram showing an illustrative example of a user accessing information from the personal information data blockchain 140. In this example, an Application Program Interface (API) 510 provides an interface to the blockchain platform 520 that supports the personal information data blockchain. The blockchain platform 520 supports smart contract 522, which includes scripts 524 with code that, when executed by the blockchain platform 520, performs operations with respect to the personal information data blockchain.

In the example of FIG. 5, three scripts are defined in smart contract 522. The ACCESS script 524A provides the capability for a user to access the personal information data blockchain 140 for the current personal information data. The STORE.PERSONAL.INFO script 524B provides the capability for an owner of personal information to add or modify personal information data maintained on the personal information data blockchain, such as is described with respect to personal information data blocks 352, 362 and 372 of FIGS. 3B, 3C and 3D, respectively. And the SHARE script 524C that provides the capability for an owner of the personal information data to control access to their personal information data by adding and modifying platforms and/or permissions maintained on an authorized access data blockchain. The scripts 524 shown are merely examples and many other different or additional scripts can be defined using the capability of the executable scripts in smart contract 522 as provided for on blockchain platform 520.

FIG. 5 shows a platform system 502, such as client/server devices 120 in FIG. 1, submitting a getPersInfoData(platformID) request 504 for personal information data through API 510. API 510 invokes smart contract 522 causing blockchain platform 520 to execute the ACCESS script 524A. The ACCESS script 524A validates the platformID against an authorized access data, such as the authorized access data stored in blockchain 150 in FIG. 1, and traverses the personal information data blockchain, such as blockchain 140 in FIG. 1, to obtain the current personal information data and sends the current data to user system 502 in a message 506.

Blockchain Ledger Data Structure

Figure 6A:
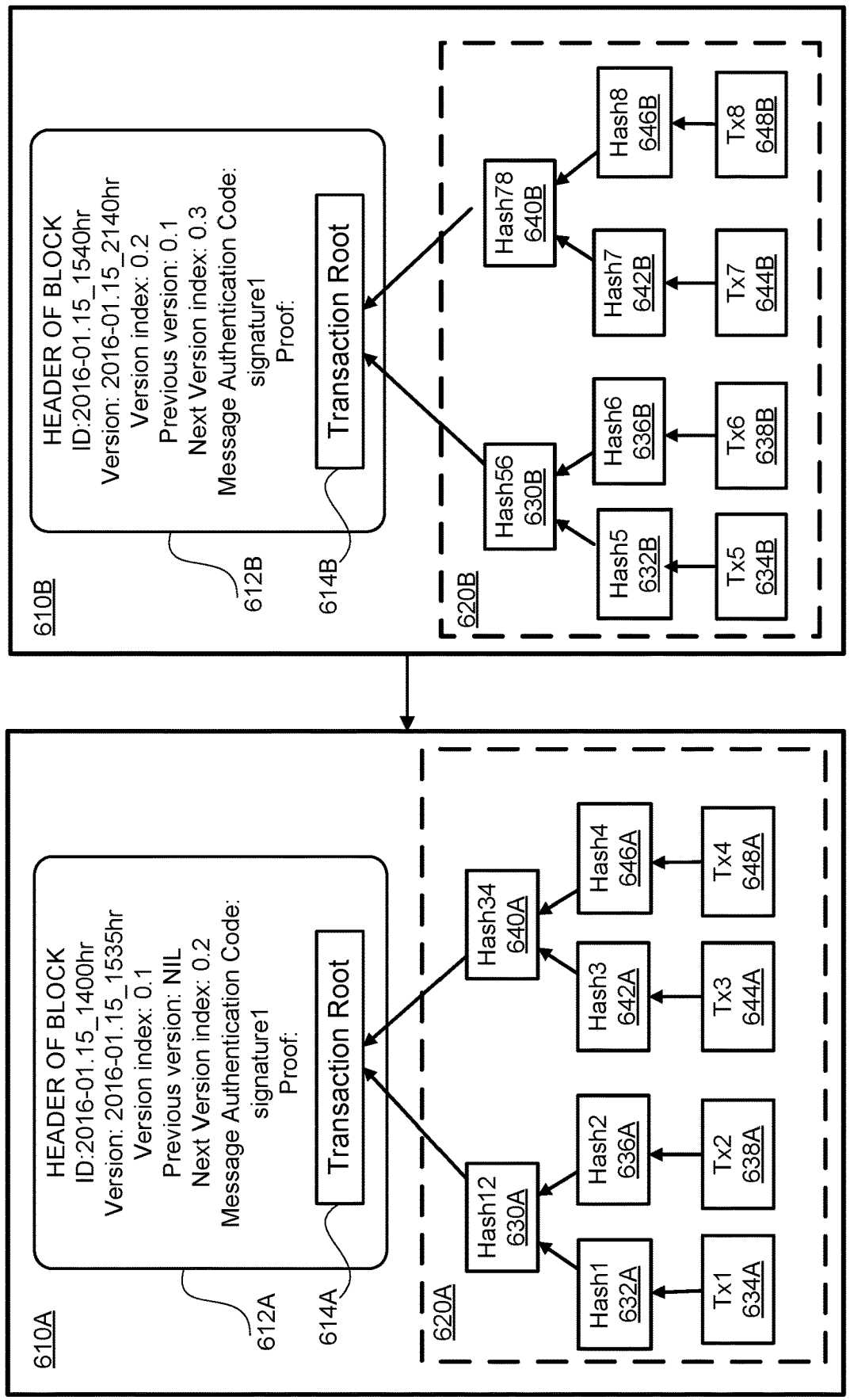
FIG. 6A is a data architecture diagram illustrating a simplified example of a blockchain ledger based on the blocks of the personal information data blockchain or the blocks of the authorized access data blockchain of FIG. 1.

FIG. 6A is a data architecture diagram illustrating a simplified example of a blockchain ledger 600 based on the blocks 142A-E of the personal information data blockchain 140 or the blocks 152A-E of the authorized access data blockchain 150 of FIG. 1. The blockchain ledger 600 example of FIG. 6A is simplified to show block headers, metadata and signatures of blocks 210A-E in order to demonstrate a traceable secure personal information data using a blockchain. In outline, a blockchain ledger may be a globally shared transactional database.

FIG. 6A is an illustrative example of a blockchain ledger 600 with a data tree holding transaction data that is verified using cryptographic techniques. In FIG. 6A, each block 610 includes a block header 612 with information regarding previous and subsequent blocks and stores a transaction root node 614 to a data tree 620 holding transactional data. Transaction data may store smart contracts, data related to transactions, or any other data. The elements of smart contracts may also be stored within transaction nodes of the blocks.

In the example of FIG. 6A, a Merkle tree 620 is used to cryptographically secure the transaction data. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
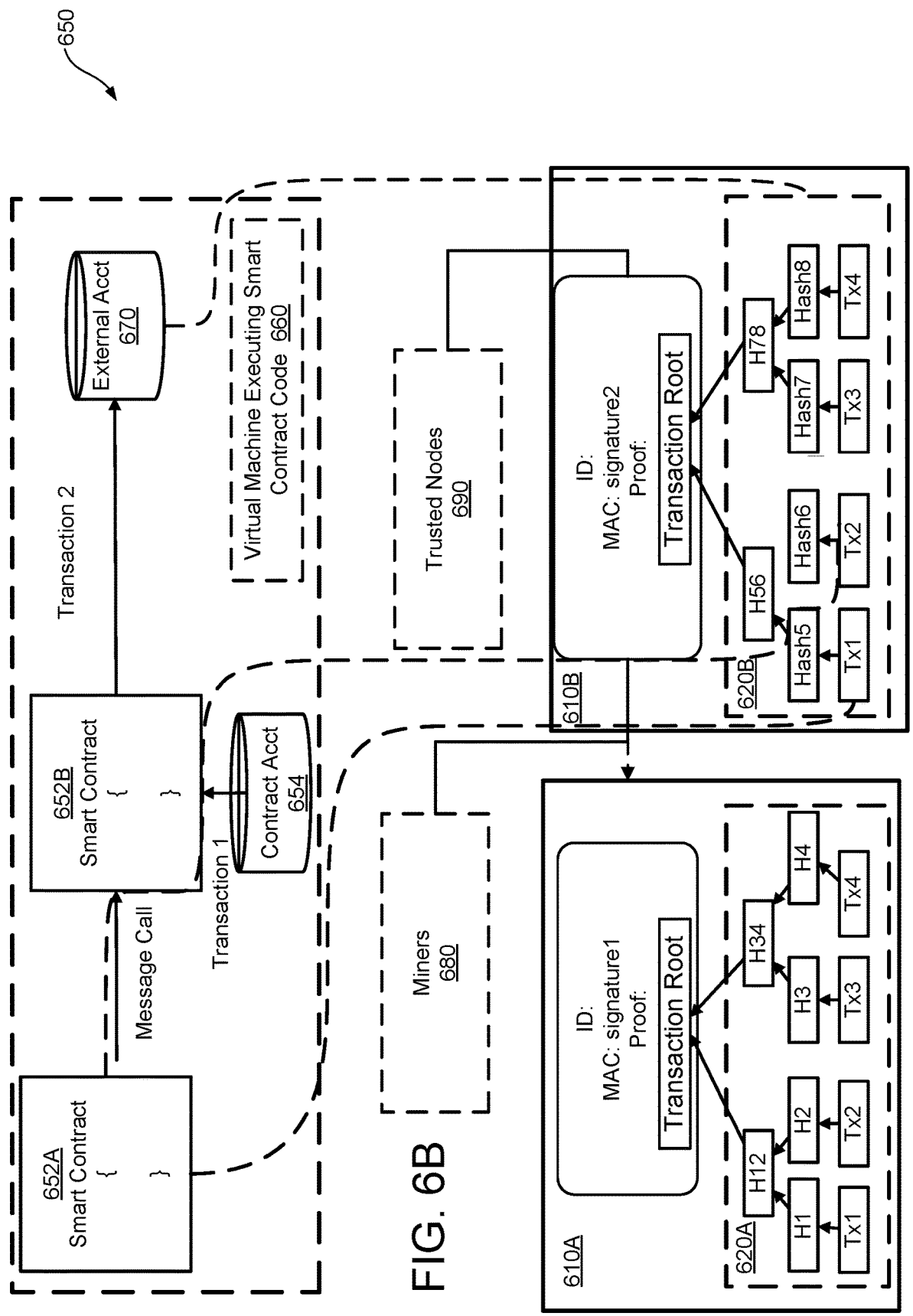
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 652 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 652 are executed in a virtual machine environment, although this is optional.

In FIG. 6B, the aspects of smart contracts 652 are stored in transaction data nodes in data tree 620 in the blocks 610 of the blockchain ledger of FIG. 6A. In the example of FIG. 6B, Smart Contract 652A is stored in data block Tx1 node 634A of data tree 620A in block 610A, Smart Contract 652B is stored in Tx2 node 638A, Contract Account 654 associated with Smart Contract 652B is stored in Tx3 node 644A, and External Account is stored in Tx4 node 648A.

Storage of Smart Contracts and Transaction Data in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates transaction data, the transaction data must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process is determined by a centralized control of a cluster of trusted nodes. In this case, the centralized control may be a trusted node, such as owner device 110, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a change data block 142 for personal information data blockchain 140 or an authorized access data block 152 for authorized access data blockchain 150, the block is an unconfirmed and unidentified entity. To be part of the acknowledged "currency", it may be added to the blockchain, and therefore relates to the concept of a trusted cluster.

In a trusted cluster, when a change data block 142 or authorized access data block 152 is added, every node competes to acknowledge the next "transaction" (e.g. a change to the personal information data or the authorized access data). In one example, the nodes compete to mine and get the lowest hash value: min{ previous_hash, contents_hash, random_nonce_to_be_guessed}→result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to personal information data or authorized access data, may also be ciphered for restricted access so that the meta-data does not disclose information pertaining to the personal information data or the authorized access data.

The mining process, such as may be used in concert with the validation process 470 of FIG. 4C, may be utilized to deter double accounting, overriding or replaying attacks, with the community arrangement on the agreement based on the "good faith" that no single node can control the entire cluster. The working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast to the network using software Mining nodes validate transactions, add them to the block they are building, and then broadcast the completed block to other nodes.

Note that in a restricted network, stake-holders who are authorized to check or mine for the personal information data or authorized access data may or may not access the transaction blocks themselves, but would need to have keys to the meta-data (since they are members of the restricted network, and are trusted) to get the details. As keys are applied on data with different data classifications, the stakeholders can be segmented.

A decentralized blockchain may also use ad-hoc secure message passing and distributed networking. In this example, the personal information data blockchain or authorized access data blockchain ledgers may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the authorized access list as centrally authorized and kept offline.

In some examples, access to a distributed personal information data blockchain or an authorized access data blockchain ledger may be restricted by cryptographic means to be only open to authorized servers. Since one or both of the blockchain ledgers are distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving a secure traceable personal information blockchain ledger. The specific examples of different aspects of a personal information blockchain ledger described herein are illustrative and are not intended to limit the scope of the techniques shown.

Smart Contracts

Smart contracts are defined by code. As described previously, the terms and conditions of the smart contract may be encoded (e.g., by hash) into a block-chain ledger. Specifically, smart contracts may be compiled into a bytecode (if executed in a virtual machine), and then the bytecode may be stored in a block-chain ledger as described previously. Similarly, transaction data executed and generated by smart contracts may be stored in the block-chain ledger in the ways previously described.

Computer Architectures for Use of Smart Contracts and Blockchain Ledgers

Figure 8:
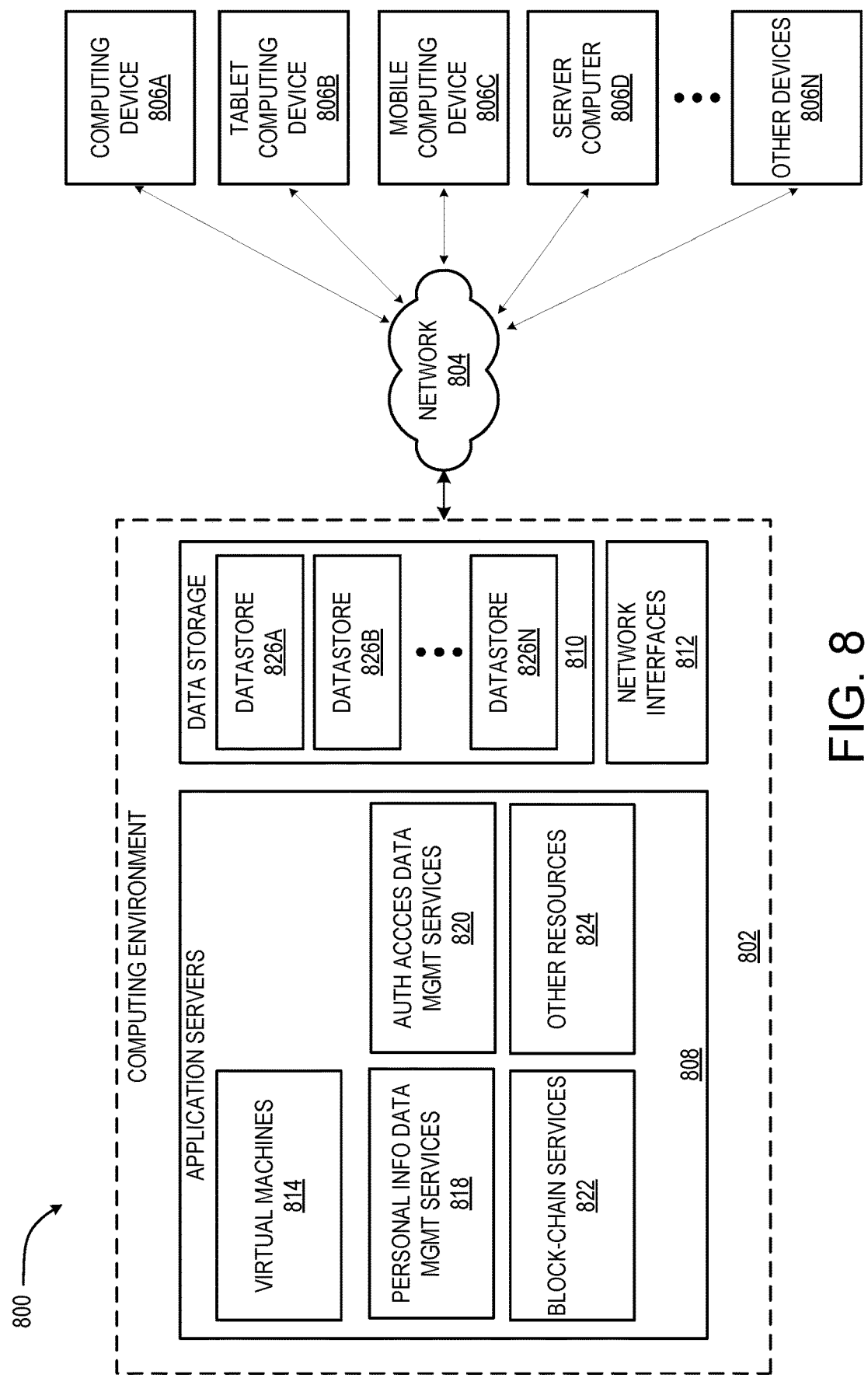
FIG. 8 is a diagram illustrating a distributed computing environment capable of implementing aspects of the techniques and technologies presented herein.

Note that at least parts of processes 400, 420, 450 and 470 of FIGS. 4A, 4B, 4C and 4D, the scripts of personal information data block 342, 362 and 372 of FIGS. 3B, 3C and 3D, smart contract 522 of FIG. 5, smart contracts 652 of FIG. 6B, and other processes and operations pertaining to personal information data blockchain and authorized access data blockchain ledgers described herein may be implemented in one or more servers, such as computer environment 800 in FIG. 8, or the cloud, and data defining the results of user control input signals translated or interpreted as discussed herein may be communicated to a user device for display. Alternatively, the personal information data and authorized access data blockchain ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 420, 450 and 470 of FIGS. 4A, 4B, 4C and 4D, the scripts of personal information data blocks 352, 362 and 372 of FIGS. 3B, 3C and 3D, smart contract 522 of FIG. 5, smart contracts 652 of FIG. 6B) are described herein as being implemented, at least in part, by an application, component, and/or circuit. Although the following illustration refers to the components of FIGS. 3B, 3C, 3D, 4A, 4B, 4C, 4D, 5 and 6B, 1, 5, 6 and 7, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 420, 450 and 470 of FIGS. 4A, 4B, 4C and 4D, the scripts of personal information data blocks 352, 362 and 372 of FIGS. 3B, 3C and 3D, smart contract 522 of FIG. 5, smart contracts 652 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 7:
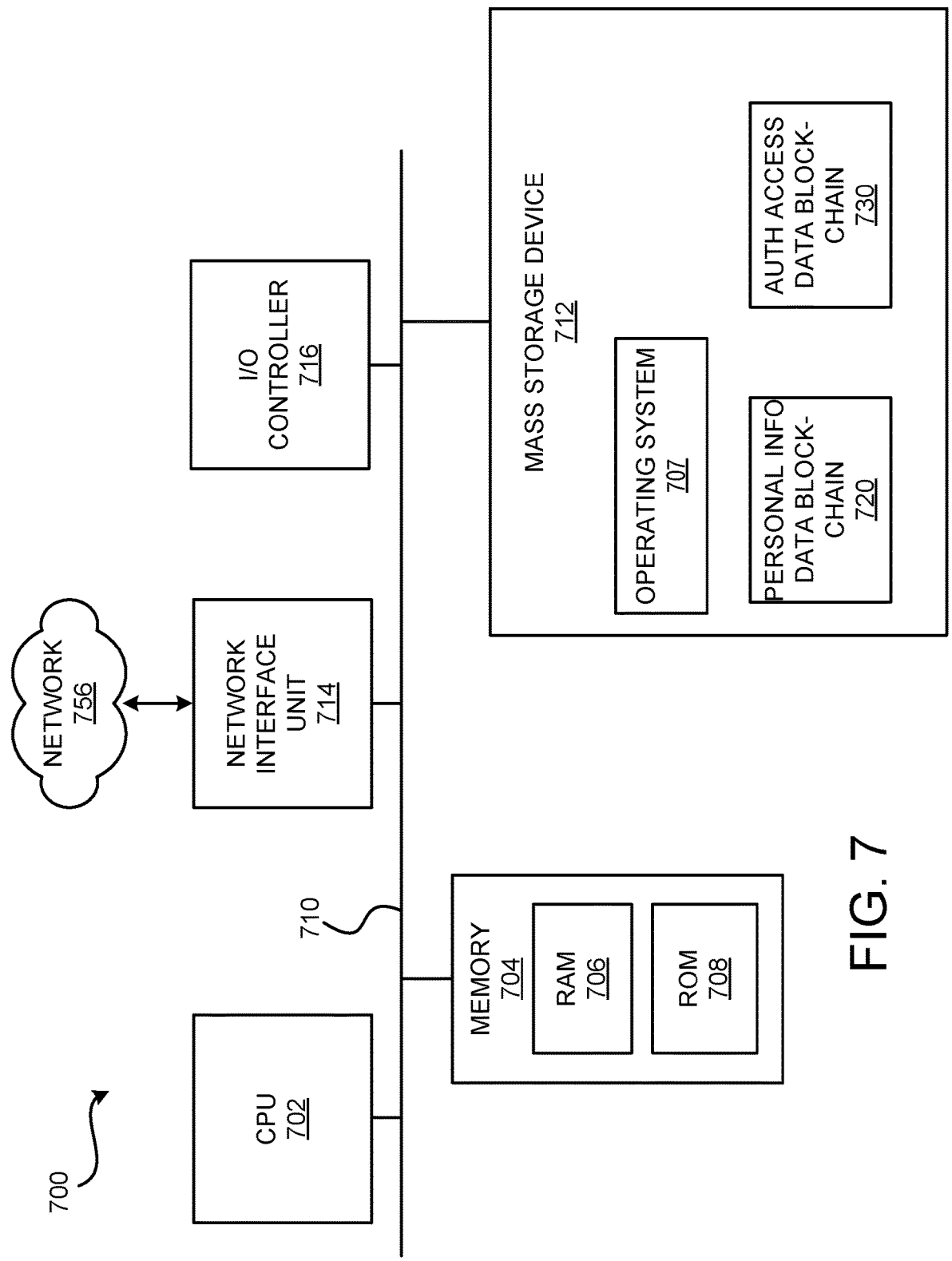
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the owner device 110 and client/server devices 120A-C (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as a copy of personal information data blockchain 720 or authorized access data blockchain 730), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for a personal information data blockchain or an authorized access data blockchain ledger. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 556, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for personal information data and authorized access data blockchain ledgers. It should be understood that this configuration is illustrative only and should not be construed as being limiting in any way.

According to various implementations, the application servers 808 also include one or more personal information data management services 818, authorized access data management services 820, and one or more blockchain services 822. The personal information data management services 818 can include services for managing personal information data on a personal information data blockchain, such as personal information data blockchain 140 in FIG. 1. The authorized access data management services 820 can include services for managing authorized access data on authorized access data blockchain, such as authorized access data blockchain 150 in FIG. 1. The blockchain services 822 can include services for participating in management of one or more blockchains, such as by creating genesis blocks, transaction blocks, and performing validation.

As shown in FIG. 8, the application servers 808 also can host other services, applications, portals, and/or other resources ("other resources") 824. The other resources 824 can include, but are not limited to, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for a personal information data blockchain or an authorized access data blockchain. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting personal information data and authorized access data blockchain ledgers, among other aspects.

Figure 9:
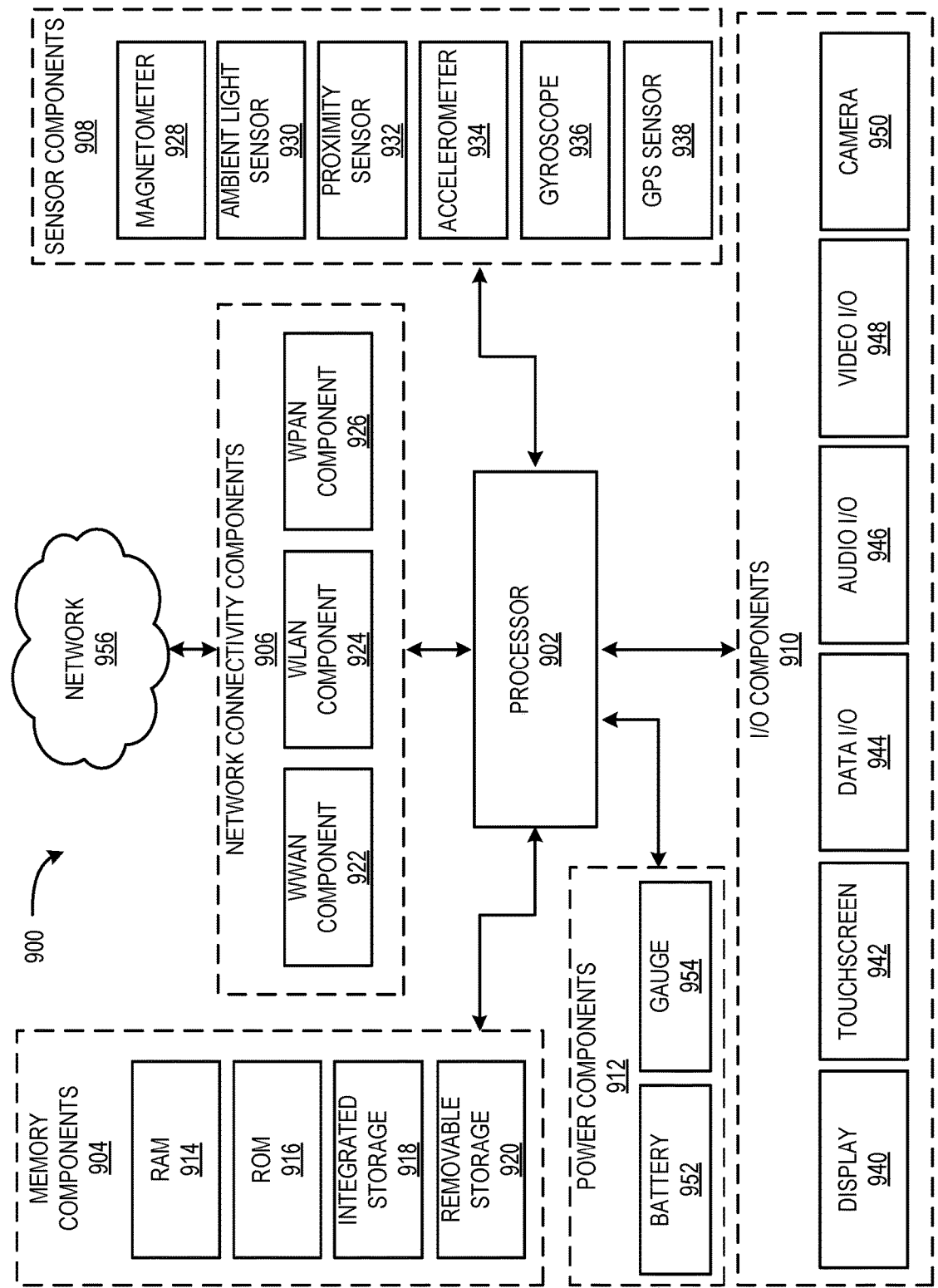
FIG. 9 is a computer architecture diagram illustrating a computing device architecture for a computing device capable of implementing aspects of the techniques and technologies presented herein.

Turning now to FIG. 9, an illustrative computing device architecture 900 for a computing device that is capable of executing various software components is described herein for personal information data and authorized access data blockchain ledgers. The computing device architecture 900 is applicable to computing devices that can manage personal information data and authorized access data blockchain ledgers. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the servers 110 and 120A-C shown in FIG. 1 and computing device 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, California and others. In some configurations, the processor 902 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSOFT AZURE from Microsoft Corporation of Redmond, Washington or AWS from Amazon Corporation of Seattle, Washington The operating system may also include WINDOWS MOBILE OS from Microsoft Corporation of Redmond, Washington, WINDOWS PHONE OS from Microsoft Corporation, WINDOWS from Microsoft Corporation, PALM WEB OS from Hewlett-Packard Company of Palo Alto, California, BLACKBERRY OS from Research In Motion Limited of Waterloo, Ontario, Canada, MAC OS or IOS from Apple Inc. of Cupertino, California, and ANDROID OS from Google Inc. of Mountain View, California Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

EXAMPLES OF VARIOUS IMPLEMENTATIONS

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following examples:

Example 1: A computer-implemented method for management of personal information data, the method comprising: storing personal information data in a personal information data block and committing the personal information data block to a personal information data blockchain; authorizing access to the personal information data by a first platform entity by storing a first platform identifier corresponding to the first platform entity in authorized access data; receiving an access request from the first platform entity, the access request including the first platform identifier for the first platform entity; verifying whether the first platform identifier of the first platform entity is identified in the authorized access data; and if the first platform identifier is included in the authorized access data: obtaining the personal information data from the personal information data blockchain, and returning the personal information data to the first platform entity.

Example 2: The computer-implemented method of example 1, where the personal information data block includes: a first executable script that, when executed, performs the step of storing personal information data in a personal information data block and committing the personal information data block to a personal information data blockchain; a second executable script that, when executed, performs the step of authorizing access to the personal information data by a first platform entity by storing a first platform identifier corresponding to the first platform entity in the authorized access data; and a third executable script that, when executed, performs the step of searching the authorized access data for the first platform identifier of the first platform entity.

Example 3: The computer-implemented method of example 1, where: the step of authorizing access to the personal information data by a first platform entity by storing a first platform identifier corresponding to the first platform entity in authorized access data stored on an authorized access data blockchain includes storing a first permissions value in association with the first platform identifier, the first permissions value identifying one or more portions of the personal information data for which the first platform entity is authorized to access; the step of verifying whether the first platform identifier of the first platform entity is identified in the authorized access data includes obtaining the first permissions value for the first platform entity; and
the step of returning the personal information data to the first platform entity comprises: filtering the personal information data based on the first permissions value to determine the one or more portions of the personal information data that the first platform entity is authorized to access, and returning to the first platform entity only the one or more portions of the personal information data that the first platform entity is authorized to access.

Example 4: The computer-implemented method of example 1, wherein the step of authorizing access to the personal information data by a first platform entity by storing a first platform identifier corresponding to the first platform entity in authorized access data comprises: authorizing access to the personal information data by the first platform entity by storing the first platform identifier corresponding to the first platform entity in a first authorized access data block and committing the first authorized access data block to an authorized access data blockchain.

Example 5: The computer-implemented method of example 4, where the method includes: terminating access to the personal information data by the first platform entity by adding a second authorized access data block to the authorized access data blockchain that removes the first platform identifier from the authorized access data and committing the second authorized access data block to the authorized access data blockchain.

Example 6: The computer-implemented method of example 4, where the personal information data block includes: a first executable script that, when executed, performs the step of storing personal information data in a personal information data block and committing the personal information data block to a personal information data blockchain; a second executable script that, when executed, performs the step of authorizing access to the personal information data by a first platform entity by storing a first platform identifier corresponding to the first platform entity in authorized access data block and committing the authorized access data block to an authorized access data blockchain; and a third executable script that, when executed, performs the step of searching the authorized access data blockchain for the first platform identifier of the first platform entity.

Example 7: The computer-implemented method of example 1, where the authorized access data is stored on the personal information data blockchain.

Example 8: A system for management of personal information data, the system comprising: one or more processors; and one or more memory devices in communication with the one or more processors, the memory devices having computer-readable instructions stored thereupon that, when executed by the processors, cause the processors to: store personal information data in a personal information data block and commit the personal information data block to a personal information data blockchain; authorize access to the personal information data by a first platform entity by storing a first platform identifier corresponding to the first platform entity in authorized access data; receive an access request from the first platform entity, the access request including the first platform identifier for the first platform entity; verify whether the first platform identifier of the first platform entity is identified in the authorized access data; and if the first platform identifier is included in the authorized access data: obtain the personal information data from the personal information data blockchain, and return the personal information data to the first platform entity.

Example 9: The system of example 8, where the personal information data block includes: a first executable script that, when executed, performs the step of storing personal information data in a personal information data block and committing the personal information data block to a personal information data blockchain; a second executable script that, when executed, performs the step of authorizing access to the personal information data by a first platform entity by storing a first platform identifier corresponding to the first platform entity in the authorized access data; and a third executable script that, when executed, performs the step of searching the authorized access data for the first platform identifier of the first platform entity.

Example 10: The system of example 8, where the system is configured such that: the function to authorize access to the personal information data by a first platform entity by storing a first platform identifier corresponding to the first platform entity in authorized access data stored on an authorized access data blockchain includes storing a first permissions value in association with the first platform identifier, the first permissions value identifying one or more portions of the personal information data for which the first platform entity is authorized to access; the function to verify whether the first platform identifier of the first platform entity is identified in the authorized access data includes obtaining the first permissions value for the first platform entity; and the function to return the personal information data to the first platform entity comprises: filtering the personal information data based on the first permissions value to determine the one or more portions of the personal information data that the first platform entity is authorized to access, and returning to the first platform entity only the one or more portions of the personal information data that the first platform entity is authorized to access.

Example 11: The system of example 8, where the system is configured to authorize access to the personal information data by a first platform entity by storing a first platform identifier corresponding to the first platform entity in authorized access data by: authorizing access to the personal information data by the first platform entity by storing the first platform identifier corresponding to the first platform entity in a first authorized access data block and committing the first authorized access data block to an authorized access data blockchain.

Example 12: The system of example 11, where the system is configured to: terminate access to the personal information data by the first platform entity by adding a second authorized access data block to the authorized access data blockchain that removes the first platform identifier from the authorized access data and committing the second authorized access data block to the authorized access data blockchain.

Example 13: The system of example 11, where the personal information data block includes: a first executable script that, when executed, performs the step of storing personal information data in a personal information data block and committing the personal information data block to a personal information data blockchain; a second executable script that, when executed, performs the step of authorizing access to the personal information data by a first platform entity by storing a first platform identifier corresponding to the first platform entity in authorized access data block and committing the authorized access data block to an authorized access data blockchain; and a third executable script that, when executed, performs the step of searching the authorized access data blockchain for the first platform identifier of the first platform entity.

Example 14: The system of example 8, where the authorized access data is stored on the personal information data blockchain.

Example 15: A computer storage medium having computer executable instructions stored thereon which, when executed by one or more processors, cause the processors to execute a personal information management method comprising operations for: storing personal information data in a personal information data block and committing the personal information data block to a personal information data blockchain; authorizing access to the personal information data by a first platform entity by storing a first platform identifier corresponding to the first platform entity in authorized access data; receiving an access request from the first platform entity, the access request including the first platform identifier for the first platform entity; verifying whether the first platform identifier of the first platform entity is identified in the authorized access data; and if the first platform identifier is included in the authorized access data: obtaining the personal information data from the personal information data blockchain, and returning the personal information data to the first platform entity.

Example 16: The computer storage medium of example 15, where the personal information data block includes: a first executable script that, when executed, performs the operation of storing personal information data in a personal information data block and committing the personal information data block to a personal information data blockchain; a second executable script that, when executed, performs the step of authorizing access to the personal information data by a first platform entity by storing a first platform identifier corresponding to the first platform entity in the authorized access data; and a third executable script that, when executed, performs the operation of searching the authorized access data for the first platform identifier of the first platform entity.

Example 17: The computer storage medium of example 15, where: the operation of authorizing access to the personal information data by a first platform entity by storing a first platform identifier corresponding to the first platform entity in authorized access data stored on an authorized access data blockchain includes storing a first permissions value in association with the first platform identifier, the first permissions value identifying one or more portions of the personal information data for which the first platform entity is authorized to access; the operation of verifying whether the first platform identifier of the first platform entity is identified in the authorized access data includes obtaining the first permissions value for the first platform entity; and the operation of returning the personal information data to the first platform entity comprises: filtering the personal information data based on the first permissions value to determine the one or more portions of the personal information data that the first platform entity is authorized to access, and returning to the first platform entity only the one or more portions of the personal information data that the first platform entity is authorized to access.

Example 18: The computer storage medium of example 15, wherein the operation of authorizing access to the personal information data by a first platform entity by storing a first platform identifier corresponding to the first platform entity in authorized access data comprises: authorizing access to the personal information data by the first platform entity by storing the first platform identifier corresponding to the first platform entity in a first authorized access data block and committing the first authorized access data block to an authorized access data blockchain.

Example 19: The computer storage medium of example 18, where the personal information management method includes an operation for: terminating access to the personal information data by the first platform entity by adding a second authorized access data block to the authorized access data blockchain that removes the first platform identifier from the authorized access data and committing the second authorized access data block to the authorized access data blockchain.

Example 20: The computer storage medium of example 15, where the authorized access data is stored on the personal information data blockchain.

What is claimed is:

1. A computer-implemented method comprising:
creating, based on receiving inputs from an owner device of an owner of personal information data, a genesis block for each of a personal information data blockchain and an authorized access data blockchain;
storing authorized access data in an authorized access data block and committing the authorized access data block to the authorized access data blockchain, the authorized access data blockchain maintaining the authorized access data for identification of one or more platform entities that are permitted to access personal information data stored in personal information data blocks on the personal information data blockchain that is a separate blockchain from the authorized access data blockchain;
identifying a change to the authorized access data, the change being associated with the one or more platform entities;
generating a change data block based on the change to the authorized access data; and
committing the change data block to the authorized access data blockchain, wherein the change data block on the authorized access data blockchain corresponds to an access method that, when invoked, provides access to the personal information data blockchain based on the change to the authorized access data stored on the authorized access data blockchain.

2. The computer-implemented method of claim 1, wherein the personal information data blockchain stores script code executable to access the authorized access data blockchain to validate that a first platform entity seeking access to the personal information data is identified in the authorized access data, and wherein the change data block defines a platform entity of the one or more platform entities that can no longer access the personal information data of the personal information data blockchain.

3. The computer-implemented method of claim 1, further comprising:
identifying another change to the authorized access data;
generating a second change block based on the other change to the authorized access data, wherein the other change to the authorized access data comprises adding another platform entity to an authorized access list comprising the one or more platform entities; and
committing the second change data block to the authorized access data blockchain.

4. The computer-implemented method of claim 2, further comprising:
removing the platform entity that can no longer access the personal information data of the personal information data blockchain from an authorized access list comprising the one or more platform entities; and
committing the change data block to the personal information data blockchain.

5. The computer-implemented method of claim 4, wherein the authorized access data for a first platform entity from the one or more platform entities includes permission data identifying a first portion of the personal information data available to the first platform entity.

6. The computer-implemented method of claim 1, further comprising:
verifying the change data block generated for the change to the authorized access data prior to committing the change data block to the authorized access data blockchain.

7. The computer-implemented method of claim 1, further comprising:
in response to receiving a request, including an identifier for a platform entity of the one or more platform entities and based on an access script within a personal information data block of the personal information data blocks on the personal information data blockchain, for the authorized access data, providing the authorized access data in the authorized access data block and the change to the authorized access data in the change data block based on invoking the access method.

8. A system comprising:
one or more processors; and
one or more memory devices in communication with the one or more processors, the one or more memory devices having computer-readable instructions stored thereupon that, when executed by the one or more processors, cause the one or more processors to perform operations comprising:
creating, based on receiving inputs from an owner device of an owner of personal information data, a genesis block for each of a personal information data blockchain and an authorized access data blockchain;
committing an authorized access data block, having stored authorized access data, to the authorized access data blockchain, the authorized access data comprising an identifier for one or more platform entities having authorized access to personal information data stored in personal information data blocks on the personal information data blockchain that is a separate blockchain from the authorized access data blockchain;
identifying a change to the authorized access data, the change being associated with the one or more platform entities;
generating a change data block based on the change to the authorized access data; and
committing the change data block to the authorized access data blockchain, wherein the change data block on the authorized access data blockchain corresponds to an access method that, when invoked, provides access to the personal information data blockchain based on the change to the authorized access data stored on the authorized access data blockchain.

9. The system of claim 8, wherein the authorized access data blockchain and the personal information data blockchain employ different scripting languages.

10. The system of claim 8, the operations further comprising:
generating a second change data block based on identifying another change to the authorized access data, wherein the second change data block adds another platform entity to an authorized access list comprising the one or more platform entities and the platform entity; and
committing the second change data block to the authorized access data blockchain.

11. The system of claim 8, the operations further comprising providing a first platform entity from the one or more platform entities access to the personal information data stored on the personal information data blockchain based on a request from the first platform entity and based on the identifier stored to the authorized access data blockchain.

12. The system of claim 8, wherein a personal information data block of the personal information data blockchain includes a first script executable to store the personal information data in a personal information data block and commit the personal information data block to the personal information data blockchain, and wherein the authorized access data of the authorized access data blockchain includes a second script that is different from the first script, the second script executable to authorize access to a personal information data block, of the personal information data blocks on the personal information data blockchain, by the platform entity.

13. The system of claim 8, wherein the operations further comprise:
   verifying the change data block prior to committing the change data block to the authorized access data blockchain.

14. A computer storage medium having computer executable instructions stored thereon which, when executed by one or more processors, cause the one or more processors to execute operations comprising:
   creating, based on receiving inputs from an owner device of an owner of personal information data, a genesis block for each of a personal information data blockchain and an authorized access data blockchain;
   storing authorized access data in an authorized access data block and committing the authorized access data block to the authorized access data blockchain, the authorized access data including permissions that identify one or more portions of personal information data that platform entities can access, the personal information data stored in personal information data blocks on the personal information data blockchain that is a separate blockchain from the authorized access data blockchain, the platform entities including at least a first platform entity and a second platform entity;
   identifying a change, by the first platform entity, to the authorized access data;
   generating a change data block based on the change to the authorized access data, the change data block indicating that the second platform entity can no longer access the one or more portions of the personal information data of the personal information data blockchain; and
   committing the change data block to the authorized access data blockchain, wherein the change data block on the authorized access data blockchain corresponds to an access method that, when invoked, provides access to the personal information data blockchain based on the change to the authorized access data stored on the authorized access data blockchain.

15. The computer storage medium of claim 14, wherein the operations further comprise verifying the change data block based at least in part on a signature of the change data block.

16. The computer storage medium of claim 14, wherein one or more of the personal information data blocks have an executable script that, when executed, performs an operation of searching the authorized access data, corresponding to the authorized access data blockchain, for an identifier of a third platform entity of the platform entities, and wherein the script performs the operation of filtering the personal information data based on the identifier and the permissions that identify a portion of the personal information data.

17. The computer storage medium of claim 14, wherein the operations further comprise generating a second change data block that adds another platform entity to an authorized access list comprising the platform entities.

18. The computer storage medium of claim 14, wherein the operations further comprise generating a second change data block that removes a third platform entity of the platform entities from an authorized access list comprising the platform entities.

19. The computer storage medium of claim 18, wherein the operations further comprise terminating the second platform entity's access to the one or more portions of the personal information data of the personal information data blockchain.

20. The computer-implemented method of claim 1, further comprising:
   identifying a change data block for the personal information data blockchain and a signature corresponding to the change data block for the personal information data blockchain;
   committing the change data block to the personal information data blockchain; and
   obtaining, based on the change data block for the personal information data blockchain, personal information data stored on the personal information data blockchain by tracing personal information data back to a genesis data block having a signature associated with the signature of the change data block for the personal information data blockchain.

* * * * *